(12) United States Patent  (10) Patent No.: US 9,209,709 B2
Jonsson  (45) Date of Patent: Dec. 8, 2015

(54) METHOD AND SYSTEM FOR HYSTERESIS CONTROL OF A POWER CIRCUIT

(76) Inventor: Ragnar Jonsson, Ystad (SE)

( * ) Notice: Subject to any disclaimer, the term of this patent is extended or adjusted under 35 U.S.C. 154(b) by 380 days.

(21) Appl. No.: 13/497,495

(22) PCT Filed: Sep. 21, 2010

(86) PCT No.: PCT/SE2010/000225
§ 371 (c)(1),
(2), (4) Date: Mar. 21, 2012

(87) PCT Pub. No.: WO2011/037509
PCT Pub. Date: Mar. 31, 2011

(65) Prior Publication Data
US 2012/0181997 A1  Jul. 19, 2012

Related U.S. Application Data

(60) Provisional application No. 61/278,460, filed on Oct. 8, 2009.

(30) Foreign Application Priority Data

Sep. 22, 2009 (SE) ........................................ 0901211

(51) Int. Cl.
*G05F 1/10* (2006.01)
*H02M 7/538* (2007.01)

(52) U.S. Cl.
CPC .................................. *H02M 7/53803* (2013.01)

(58) Field of Classification Search
CPC ............................ G05F 1/30; H02M 7/53803
USPC ............ 323/222, 271, 282, 285; 363/17, 131, 363/132
See application file for complete search history.

(56) References Cited

U.S. PATENT DOCUMENTS

| 4,947,309 A | 8/1990 | Jonsson |
| 6,940,736 B2 | 9/2005 | Jonsson |
| 8,385,085 B2 * | 2/2013 | Hattori et al. ................... 363/17 |
| 2002/0101751 A1 | 8/2002 | Wade |
| 2007/0103132 A1 * | 5/2007 | Hendrix et al. ............... 323/282 |
| 2010/0007401 A1 | 1/2010 | Svensson |

FOREIGN PATENT DOCUMENTS

WO  2008100223  8/2008

OTHER PUBLICATIONS

International Search Report for PCT/SE2010/000225, Completed by the Swedish Patent Office on Dec. 10, 2010, 3 Pages.

* cited by examiner

*Primary Examiner* — Adolf Berhane
*Assistant Examiner* — Yemane Mehari
(74) *Attorney, Agent, or Firm* — Birch, Stewart, Kolasch & Birch, LLP

(57) ABSTRACT

A device for providing electric power to a load, having two switch members ($Z_1$, $Z_2$) connected in series between positive and negative power supply rails. The first switch connected to the positive rail and the second switch connected to the negative rail, with an inductor (L) being connected to a bridge point between the switches and the load. Each switch having and a flywheel diode connected in parallel with a switchable member. A monitoring circuit monitors a current (I) through said inductor (L) and a bridge voltage (E) at said bridge point. A control circuit provides control signals to the switches for turning said switchable members ON and OFF. When said current is positive, the control circuit turns the first switch member OFF when said current exceeds a predetermined control value ($I_0$) whereupon the current decreases towards zero and passes through the flywheel diode of the second switch member.

18 Claims, 21 Drawing Sheets

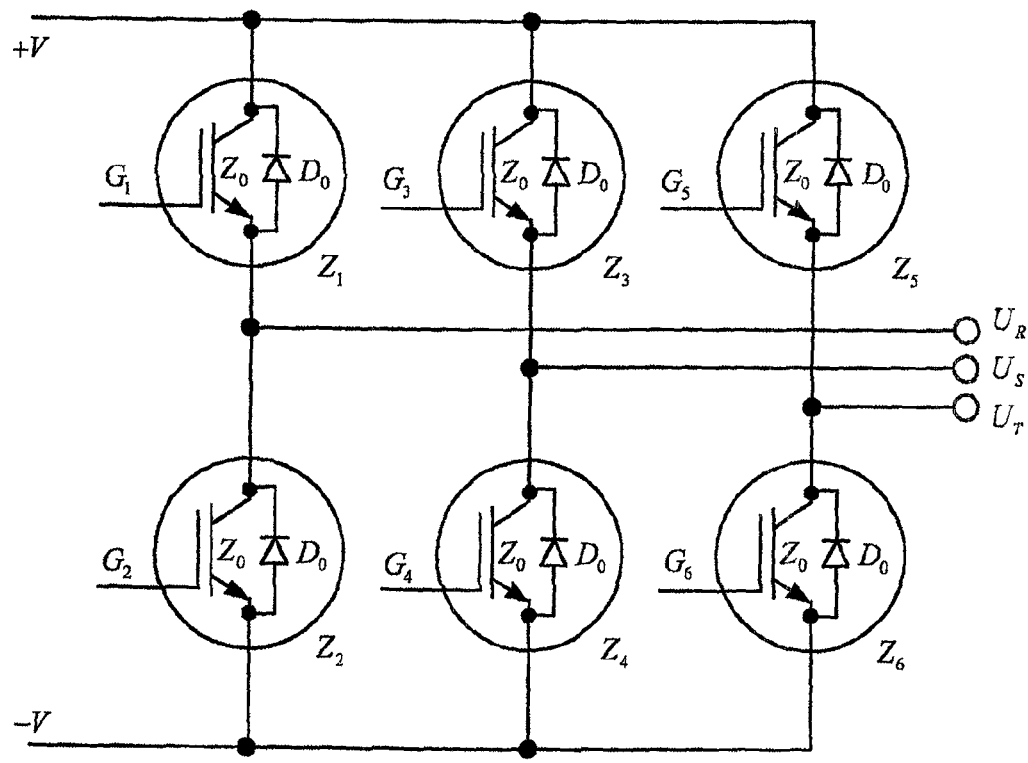
Prior Art  Figure 1
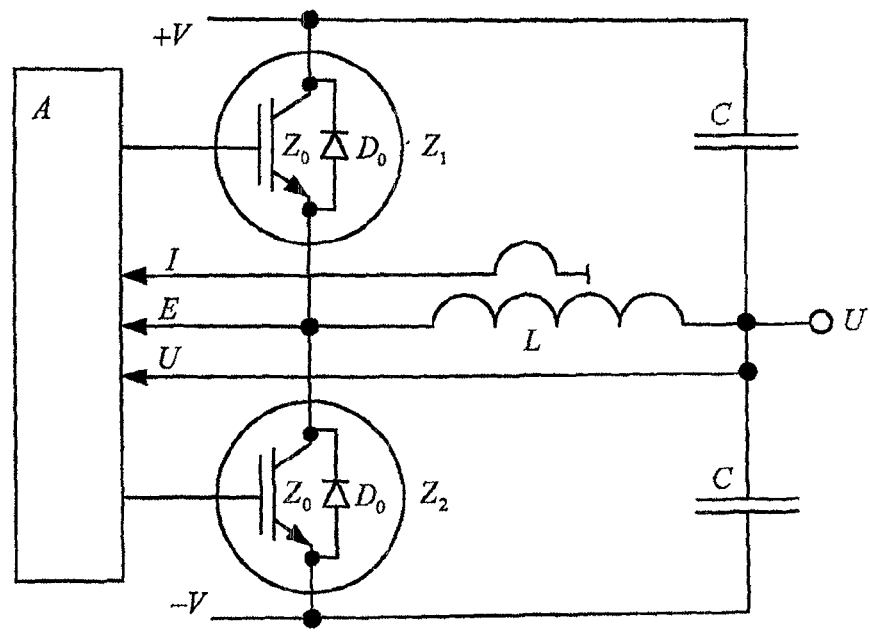
Prior Art  Figure 4

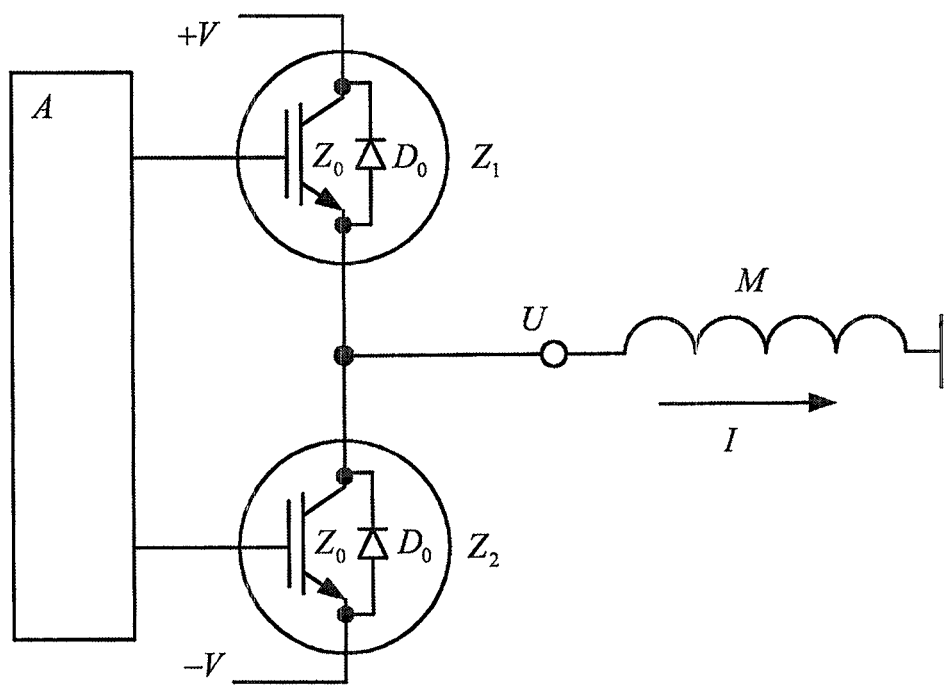
Prior Art    *Figure* 2
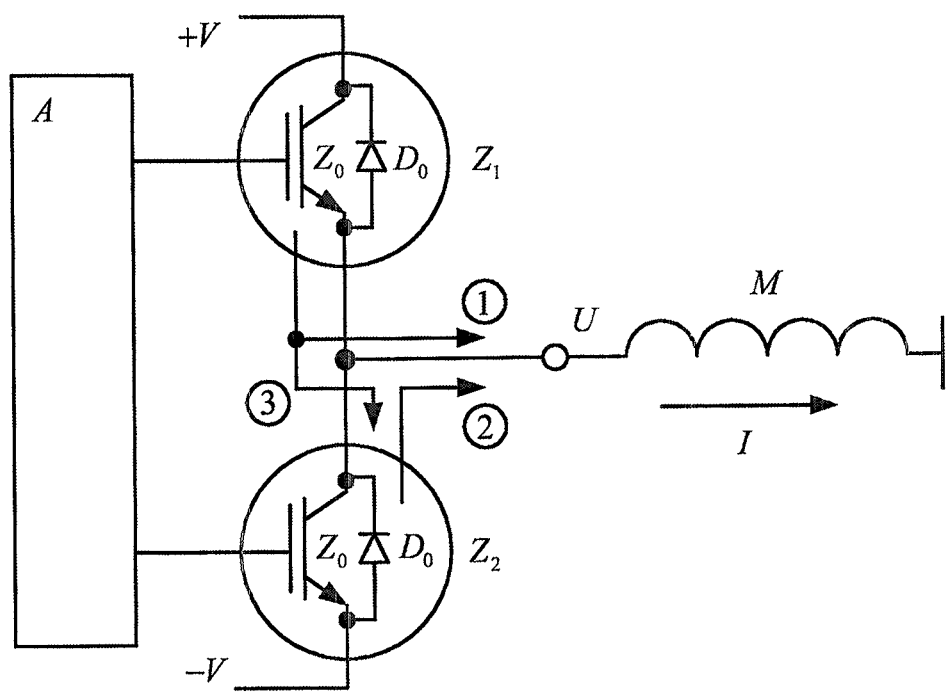
Prior Art    *Figure* 3

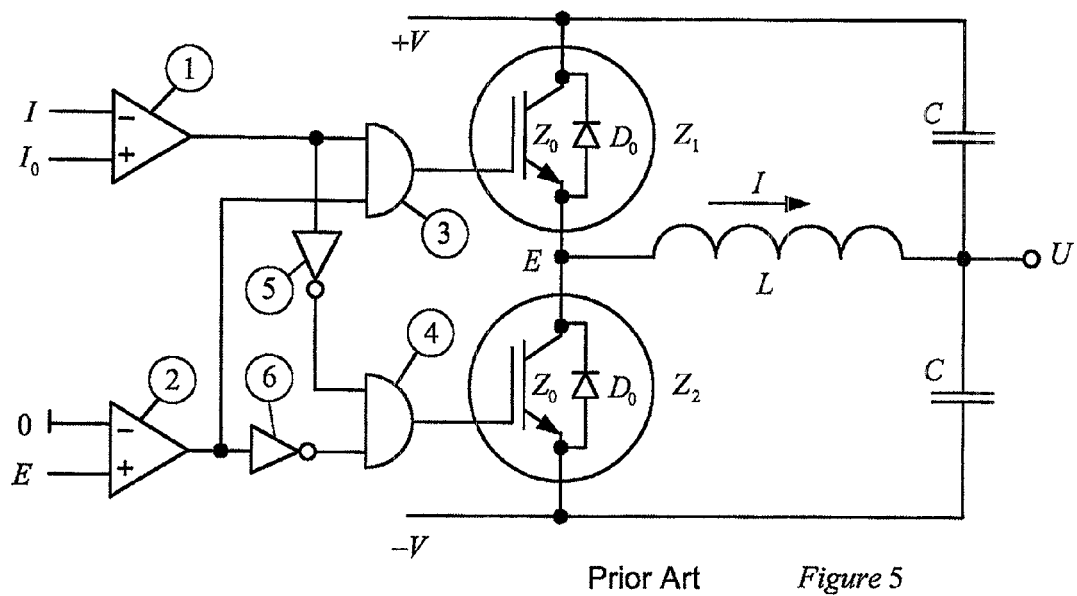
Prior Art       Figure 5
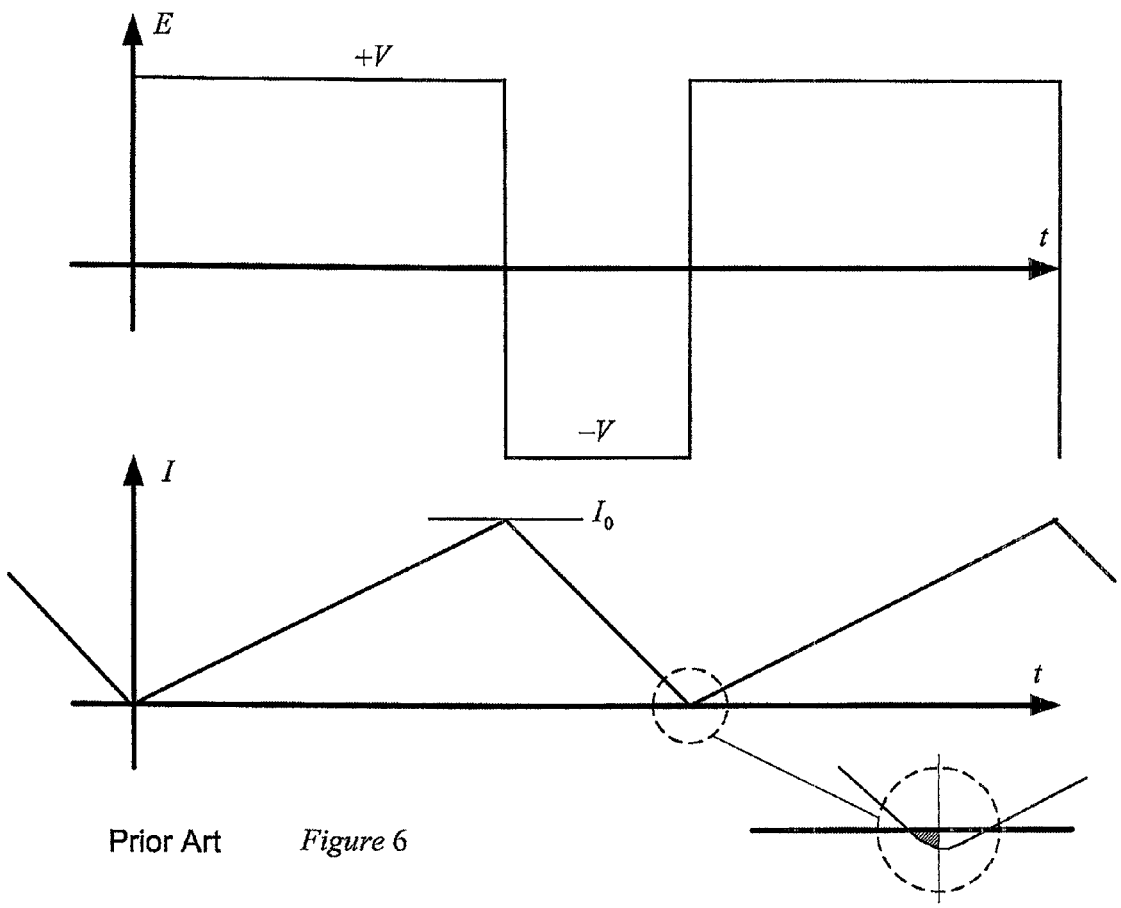
Prior Art       Figure 6

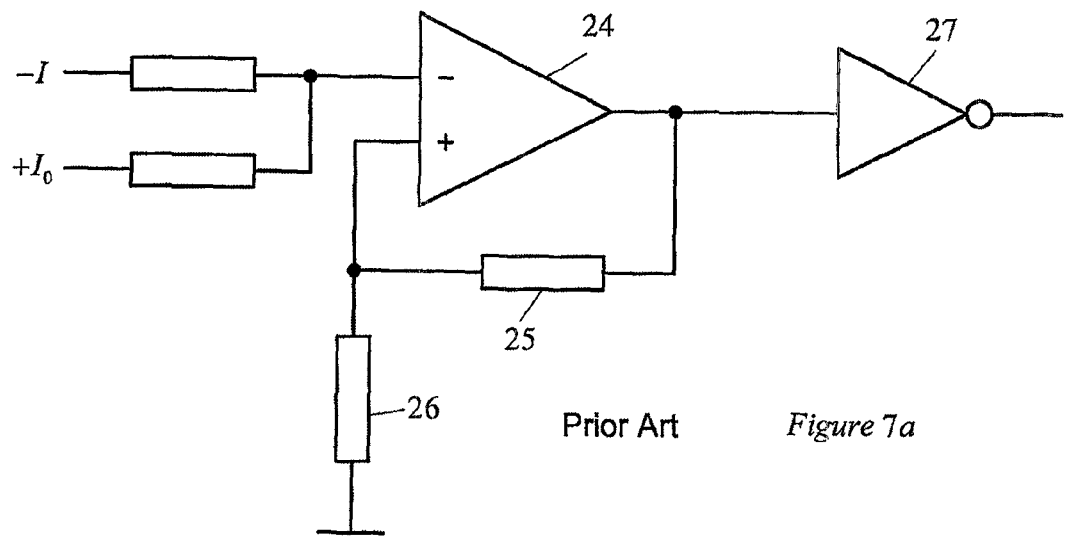
Prior Art    *Figure 7a*
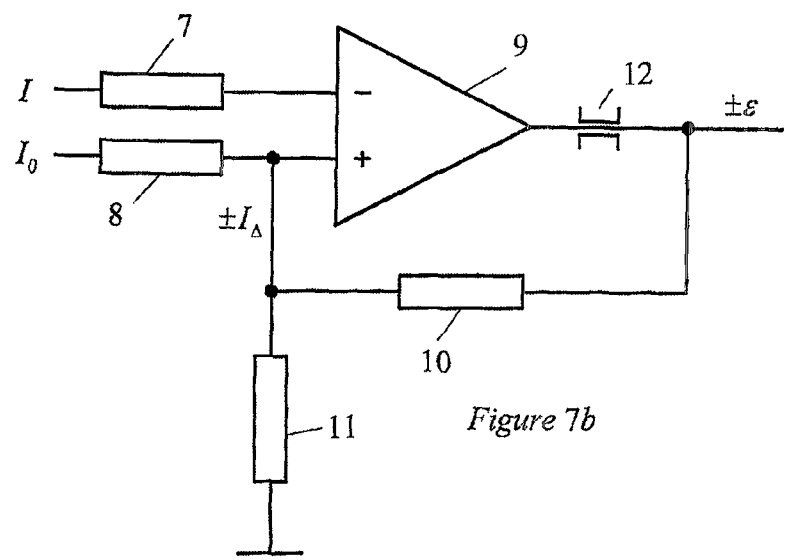
*Figure 7b*
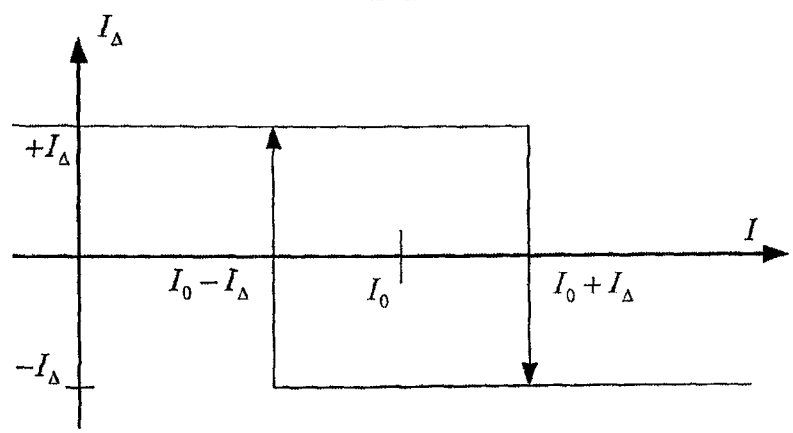
*Figure 7c*

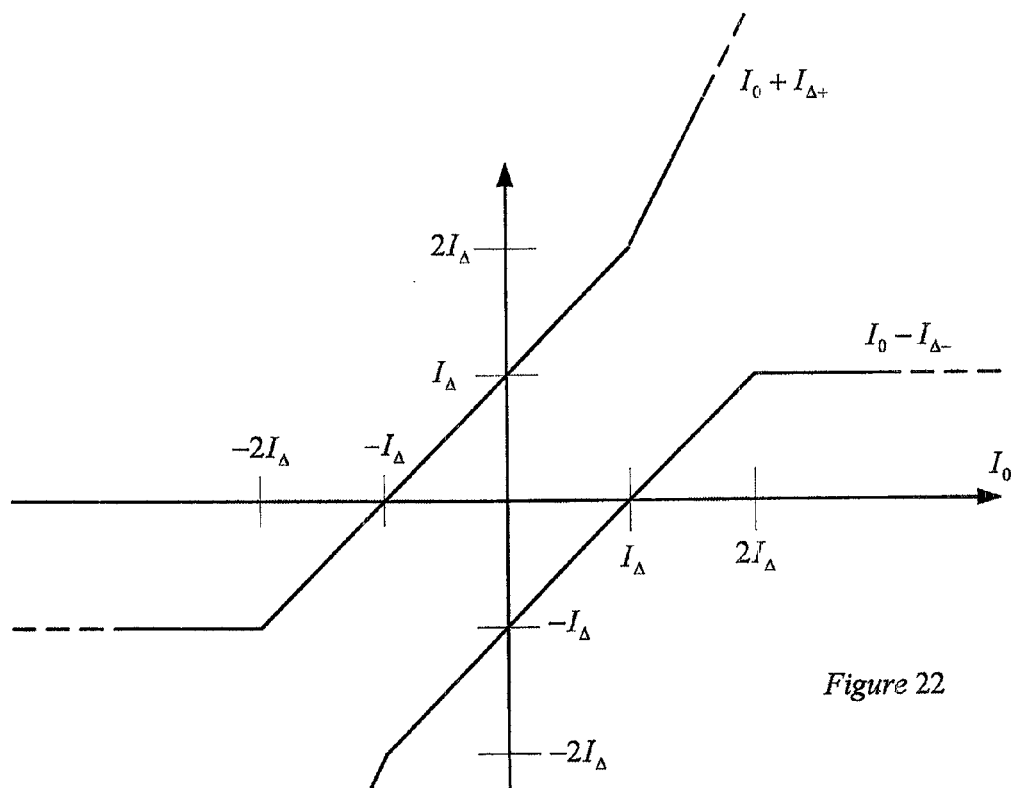
*Figure* 22
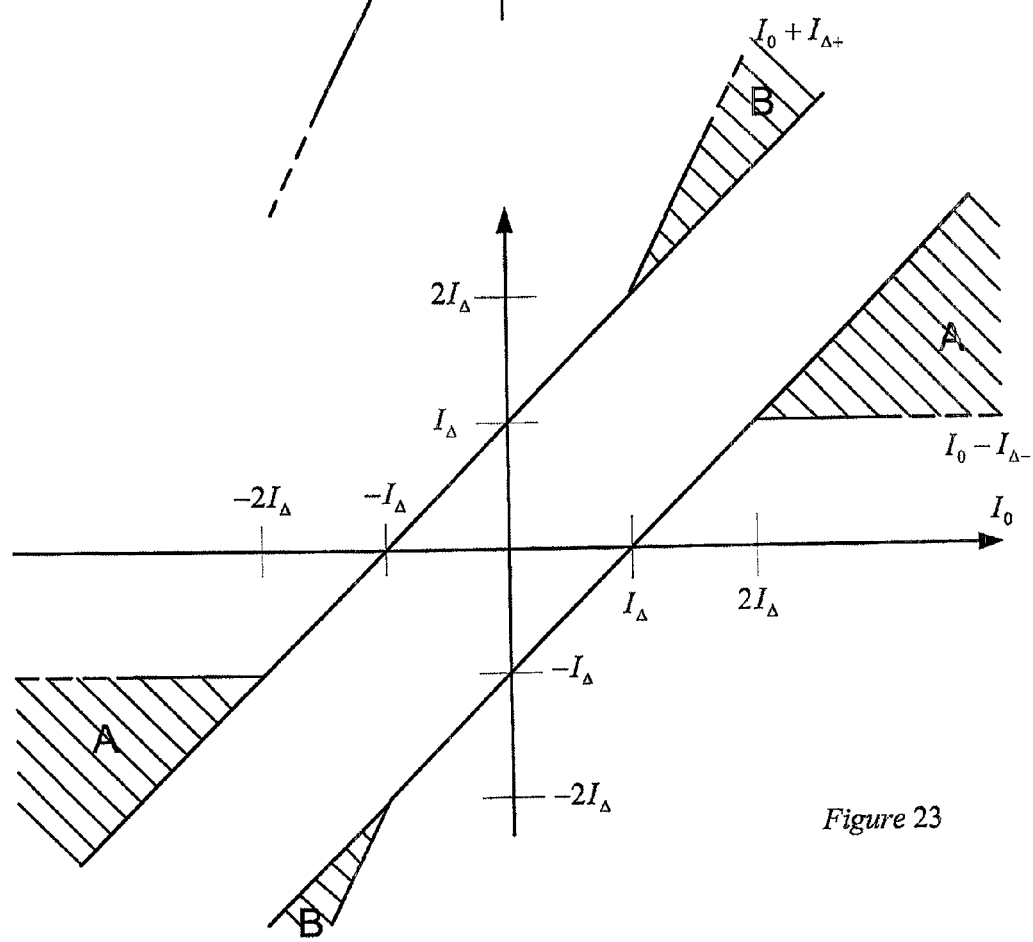
*Figure* 23

METHOD AND SYSTEM FOR HYSTERESIS CONTROL OF A POWER CIRCUIT

CROSS-REFERENCE TO RELATED APPLICATION

This application is the U.S. national phase of PCT Appln. No. PCT/SE2010/000225 filed Sep. 21, 2010, which claims priority to SE application 0901211-3 filed on Sep. 22, 2009 and claims the benefit of U.S. provisional application 61/278,460 filed on Oct. 8, 2009, the disclosures of which are incorporated in their entirety by reference herein.

AREA OF INVENTION

The present invention relates to a method and a device for providing electric power to a load, for example an electric motor. The electric power is obtained from a DC power source. The electric current is divided in short pulses, which are delivered to the load via an inductor. The frequency and the width of the pulses are modulated by means of so called pulse width modulation (PWM). There is a means for limiting the maximum frequency of pulses in order to reduce the power dissipation, especially at low currents.

BACKGROUND OF INVENTION

U.S. Pat. No. 4,947,309 discloses a method of providing electric power to a load. Two switch transistors are connected in series between two terminals of the DC power source. The bridge point between the transistors is connected to the load via an inductor. A control circuit is arranged to switch on one of the transistors, for example the transistor connected to the positive terminal. Then, the current through the inductor increases to deliver current to the load. When the current through the inductor exceeds a preset value $I_0$, the transistor is switched off and the current through the inductor takes another way through a flywheel diode of the opposite switch transistor, until the current through the inductor has decreased to zero. At this time instance, the upper transistor is again switched on and a new cycle starts. A corresponding operation takes place at negative currents but using the opposite switch transistor.

Because the switch on of the switch transistor takes place at zero current and also essentially at zero voltages as will be explained below, the switch on power losses of the switch transistor becomes negligible. The switch off consumes approximately the same power as in previously known PWM circuits.

The average current delivered to the load is approximately half of the top value of the current in the inductor. The switch frequency becomes approximately inversely proportional to the preset current value $I_0$. Since the switch losses are proportional to the switch frequency, the efficiency becomes low at low currents.

The switch frequency should be much higher than the frequency of the current delivered to the load. If the load is an electric motor, the motor frequency will normally be less than about 100 Hz. Thus, the PWM frequency should normally be higher than about 5 to 10 kHz. However, modern power transistors of the IGBT type should not be operated at higher frequencies than about 20 kHz. Thus, the operational area of the motor control becomes limited.

Thus, there is a need for a method of operating the motor control system according to U.S. Pat. No. 4,947,309 so that low currents can be controlled without increasing the PWM frequency above a predetermined frequency, for example 20 kHz.

This problem has been addressed in the publication WO 2008/100223, which discloses a switch control circuit comprising a timer circuit, which is arranged for preventing the on-switch of the switch element until a minimum time period has passed. In this way, the frequency is limited to the inverse of said time period.

SUMMARY OF THE INVENTION

Accordingly, an object of the present invention is to mitigate, alleviate or eliminate one or more of the above-identified deficiencies and disadvantages singly or in any combination.

According to an aspect of the invention, there is provided a device for providing electric power to a load, comprising two switch members connected in series between positive and negative power supply rails, the first switch member being connected to the positive rail and the second switch member being connected to the negative rail and an inductor being connected to a bridge point between the switch members and the load; wherein each switch member comprises a switchable member and a flywheel diode connected in parallel with the switchable member; a monitoring circuit for monitoring a current through said inductor and a bridge voltage at said bridge point; a control circuit for providing control signals to the switch members for turning said switchable members ON and OFF; the control circuit, when said current is positive, being adapted to turn the first switch member OFF when said current exceeds a predetermined control value whereupon the current decreases towards zero and passes through the flywheel diode of the second switch member and to turn the first switch member ON when the current is zero and the bridge voltage increases towards the positive rail and vice versa when said current is negative; and a hysteresis circuit having an upper hysteresis limit and a lower hysteresis limit which modifies said predetermined control value, wherein said upper hysteresis limit and said lower hysteresis limit are arranged so that the maximum frequency of the device at low currents is limited.

When the control value is between said upper hysteresis limit and said lower hysteresis limit, the device operates in a hysteresis mode, in which the current is both positive and negative and wherein the amplitude of the current may be substantially constant independently of the control value.

In an embodiment, the sum of said upper hysteresis limit $(I_{\Delta+})$ and said lower hysteresis limit $(I_{\Delta-})$ in said hysteresis mode may be calculated based on a nominal maximum frequency $f_{max}$ according to the formula:

$$(I_{\Delta+}+I_{\Delta-})=E/(2*L*f_{max})$$

wherein
E is a bridge voltage
L is said inductor.

In another embodiment, the sum of said upper hysteresis limit $(I_{\Delta+})$ and said lower hysteresis limit $(I_{\Delta-})$ in said hysteresis mode may be calculated based on a nominal maximum frequency $f_{max}$ according to the formula:

$$(I_{\Delta+}+I_{\Delta-})=E*(1-(U/E)^2)/2*L*f_{max}$$

wherein
E is a bridge voltage
U is a voltage over the load
L is said inductor.

In a further embodiment, said upper hysteresis limit ($I_{A+}$) and said lower hysteresis limit ($I_A$) may be equal, at least in the hysteresis mode.

In a still further embodiment, said lower hysteresis limit ($I_A$) may be dynamical outside said hysteresis mode, such as ($I_{A-})=(I_0-I_L)$, wherein $I_L$ is a constant value.

In a yet further embodiment, said higher hysteresis limit ($I_{A+}$) may be dynamical outside said hysteresis mode, such as $I_{A+}=I_0$.

In still another embodiment, said upper hysteresis limit ($I_{A+}$) and said lower hysteresis limit ($I_{A-}$) may be equal, and may be reduced at high control current ($I_0$) outside said hysteresis mode.

All the above features apply vice versa during a negative cycle of the current.

In another aspect, there is provided a method of operating a device for providing electric power to a load, said device comprising: two switch members connected in series between positive and negative power supply rails, the first switch member being connected to the positive rail and the second switch member being connected to the negative rail and an inductor being connected to a bridge point between the switch members and the load; wherein each switch member comprises a switchable member and a flywheel diode connected in parallel with the switchable member; a monitoring circuit for monitoring a current through said inductor and a bridge voltage at said bridge point; a control circuit for providing control signals to the switch members for turning said switchable members ON and OFF; a hysteresis circuit having an upper hysteresis limit and a lower hysteresis limit, which modifies said predetermined control value, the method comprising: turning the first switch member OFF by the control circuit, when said current is positive, when said current exceeds a predetermined control value, whereupon the current decreases towards zero and passes through the flywheel diode of the second switch member; and turning the first switch member ON when the current is zero and the bridge voltage increases towards the positive rail and vice versa when said current is negative; and wherein said upper hysteresis limit and said lower hysteresis limit are adjusted so that the maximum frequency of the device at low currents is limited,

BRIEF DESCRIPTION OF THE DRAWINGS

Further objects, features and advantages of the invention will become apparent from the following detailed description of embodiments of the invention with reference to the drawings, in which:

FIG. 1 is a circuit diagram of a conventional PWM output stage in a conventional frequency inverter for motor control.

FIG. 2 is a circuit diagram of one single phase of the three-phase PWM inverter according to FIG. 1.

FIG. 3 is a circuit diagram and describes a problem with conventional PWM inverters.

FIG. 4 is a circuit diagram of a single phase of a switch circuit according to U.S. Pat. No. 4,947,309.

FIG. 5 is a circuit diagram of the switch circuit according to FIG. 4 together with the control logic A.

FIG. 6 is a time diagram, which shows a bridge voltage E at the bridge point and a current I through the inductor L of the circuit according to FIG. 5.

FIG. 7a is a circuit diagram of the comparator I, which is modified with hysteresis.

FIG. 7b is a circuit diagram, which shows an alternative version of the hysteresis comparator I.

FIG. 7c is a time diagram, which shows the comparator output as a function of the input current I.

FIG. 22 and FIG. 23 are diagrams over hysteresis limits in a further embodiment.

DETAILED DESCRIPTION OF EMBODIMENTS

Figure 8A:
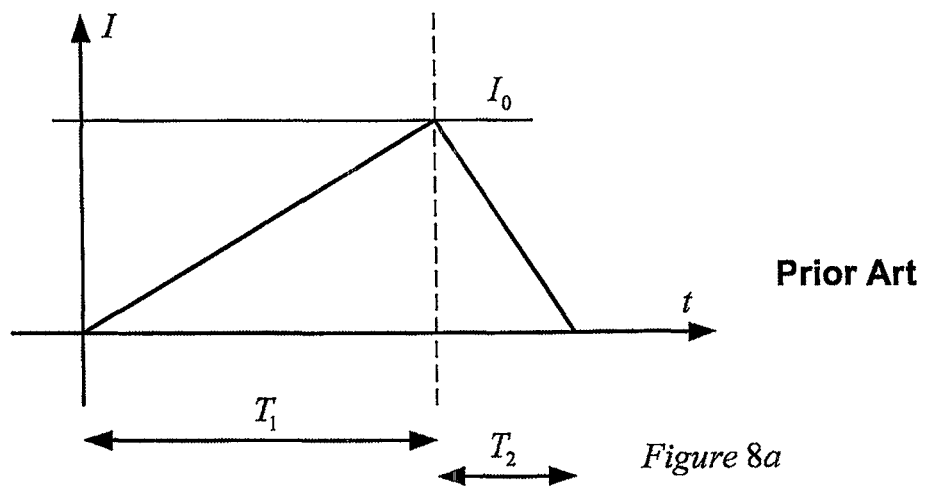
FIG. 8a is a time diagram, which shows one complete switch cycle, similar to FIG. 6.

Below, several embodiments of the invention will be described with references to the drawings. These embodiments are described in illustrating purpose in order to enable a skilled person to carry out the invention and to disclose the best mode. However, such embodiments do not limit the invention. Moreover, other combinations of the different features are possible within the scope of the invention.

The invention and the development of power transistors has made it possible to control electric power in a relatively simple way. Modern power transistors can control large voltages and currents, up to several thousand volts and hundreds of amperes. One popular and dominating system for power control is Pulse Width Modulation (PWM). Such system may have a so-called "DC Link" with a fixed DC voltage. This DC voltage is chopped to short pulses with a variable pulse width. One part of the pulse has a positive voltage and the other part a negative voltage. The pulse width is controlled in such a way that the mean value of the positive and negative pulses represents the required output voltage.

Pulse width modulation has a very high efficiency, close to 100% and this is the main reason for its popularity. Two typical applications are DC/DC-converters in power supply systems and frequency inverters for motor control. There is, however, differences between these two applications.

A DC/DC-converter "transforms" a DC voltage to a new DC voltage. It converts the DC voltage to a pulse width modulated AC voltage that is transformed and rectified to a new DC voltage. The transformation can take place by help of a conventional AC transformer but it can also be made without a transformer. In both cases the AC voltage results in a true AC current inside the converter.

A frequency inverter for motor control has a more difficult task. It is normally supplied with DC voltage from a "DC link" in the same way as a DC/DC-converter. The DC voltage is chopped into a pulse width modulated AC voltage also in the same way as in a DC/DC-converter. However, the output current is not a true AC current. The motor may have a large inductance and the motor current may have the same direction and almost the same amplitude during several voltage pulses.

A frequency inverter is normally designed for control of three-phase AC motors. There are three identical phases for control of the three motor windings. Only one phase will be described in the following. Such a single phase may also be used for control of a conventional DC motor. Normally the PWM frequency is fixed, typically within a range from 2 kHz to 16 kHz.

U.S. Pat. No. 4,947,309 describes a special switch mode for the transistors. It eliminates the drawbacks that are related to conventional PWM switching in motor control circuits. An LC-circuit at the output separates the external load from the transistors and makes it possible for the transistor current to return to zero before every new switch cycle. This results in so called "soft" turn-on of the transistors. The circuit is self-oscillating with a variable switch frequency. The frequency is low at maximum output current and high at low output current. The frequency may be very high at low output currents, typically 300 kHz. This is possible with MOSFET transistors but presently IGBT transistors cannot switch that fast. Even if modern IGBTs may be able to switch that fast, the switching losses may become excessive.

U.S. Pat. No. 6,940,736 describes a modified version of the above-mentioned special switch circuit. It is specifically designed for use of IGBT transistors. Several switch modules are connected in parallel, and the number of paralleled circuits is made dependent on the output current. One module is used for low currents and more modules are used for higher currents. This makes it possible to reduce the frequency range for each switch module. However, there is still a problem when one single module shall control very low currents. The present invention is intended to solve this problem.

FIG. 1 (prior art) shows a conventional PWM output stage in a conventional frequency inverter for motor control. There are three identical phases, each with two power transistors connected in series between a positive and negative power bus. The lower bus is defined as −V and the upper bus as +V. A typical voltage between the buses may be 560 V.

The power transistors $Z_1$-$Z_6$ are identical. Each of the transistor symbols has an internal transistor $Z_0$ and an anti-parallel so called "free-wheel" diode $D_0$. This diode is an integral part of the transistor structure in a MOSFET transistor. There is no such internal diode in an IGBT transistor structure and in this case, a separate diode is added. An IBGT, when turned on, can conduct current in one direction only. A MOSFET, when turned on, can conduct current in both directions.

The "bridge points" between the two transistors are directly connected to the outputs $U_R$, $U_S$, $U_T$. The three motor phase windings are connected directly to these outputs. The output voltages are true PWM voltages.

FIG. 2 (prior art) shows one single phase of a conventional three-phase PWM inverter. The two switch transistors $Z_1$ and $Z_2$ are controlled by signals from the control logic A. Most systems have a current sensor (not shown) for measuring the motor current I through the motor M.

FIG. 3 (prior art) describes a problem with conventional PWM inverters. Suppose that the upper transistor $Z_1$ is conducting. The current I flows to the motor along the arrow "1". This is the intended mode of operation. The motor M or load is represented by an inductor symbol. All electric motors have a relatively large inductance in the windings and the motor appears as an inductive load to the inverter. Because of this inductive characteristic, the motor current remains almost constant when the upper transistor $Z_0$ turns off. The current creates a new way through the lower free-wheel diode $D_0$. Now the current flows along the arrow "2". This is also the intended mode of operation.

However, the free-wheel diode is not a perfect or "ideal" diode. In order to turn off, the diode requires a "reverse recovery charge". This is a well-known characteristic of power diodes. The upper transistor $Z_1$ must supply this reverse recovery charge when it turns on for a new switch cycle. Consequently, the upper transistor must supply this reverse recovery charge by a current along the arrow "3" at the same time as it supplies current to the motor along the arrow "1". The reverse recovery current may have approximately the same amplitude as the normal motor current. It takes only a short time to close the lower diode $D_0$ of the lower transistor $Z_2$ by help of a reverse recovery current, typically a few microseconds, but it represents a very heavy load on the upper transistor $Z_1$. The resulting losses are defined as "switching losses" or "turn on losses". An equivalent sequence takes place for negative currents with the lower transistor and the upper diode.

This kind of turn on losses doesn't exist with other types of load, for example in DC-DC converters. Here the current is a true AC current that changes between the upper and lower transistor in every switch cycle. The switch cycle starts as in FIG. 3. The upper transistor $Z_1$ is ON and the current flows to the load (not a motor) along arrow "1". Then the upper transistor $Z_1$ turns off and the lower transistor $Z_2$ turns on almost immediately. There is a small "dead time" or "blanking time" in order to avoid a short circuit through the transistors. In the first moment the current flows according to arrow "2" through the lower diode $D_0$ of the lower transistor $Z_2$. However, the load is essentially resistive and consequently the current changes direction and begins to flow in negative direction through the lower transistor $Z_2$. Thanks to this, there is no need for a reverse recovery charge next time the upper transistor $Z_1$ turns on.

This mode of operation can be described as true AC switching.

FIG. 4 (prior art) shows one single phase of a switch circuit according to U.S. Pat. No. 4,947,309. There is a positive and a negative power bus exactly as in FIG. 1. An inductor L is connected to the bridge point between the two transistors $Z_1$ and $Z_2$. The other end of L is connected to two capacitors C. The other ends of the capacitors are connected to the plus bus and the minus bus, respectively. This is for symmetry reasons. One single capacitor would have been sufficient, at least theoretically. The electric motor (not shown) or the load is connected to the output voltage U. The LC-circuit is not a conventional output filter. Instead, the inductor L is controlled as an active "current source" that delivers a well defined current to the output capacitors C. The capacitors act as a filter for the inductor current and the output voltage U is essentially constant during a complete switch cycle. However, the output voltage will change in dependence of the mean value of the inductor current. For example, the output voltage may be a 50 Hz AC voltage for control of a standard AC motor when the switch frequency is 10 kHz or higher.

A characteristic feature of the switch circuit is that the control signals are created by the control unit A in dependence of feedback signals not only from the inductor current but also from the voltages on both sides of the inductor winding.

FIG. 5 (prior art) shows the switch circuit together with the control logic A. The different parts of the control logic operate at different voltage potentials and some kinds of isolators or "level shifters" are necessary in a real circuit. This does not change the operating principle and such details are not shown.

Transistor $Z_1$ is controlled by an AND-gate 3 and transistor $Z_2$ is controlled by an AND-gate 4. Both inputs to the AND-gate must have a logic "1" in order to turn on the transistor.

There is a current comparator 1 that compares a reference (pre-calculated) value $I_0$ with the actual (measured or estimated) value of the inductor current I. The output from the comparator is a logical "1" as long as $I_0 \geq I$.

There is a voltage comparator 2 that detects the sign of the bridge voltage E. The output from the comparator is a logical "1" as long as $E \geq 0$.

The upper AND-gate 3 is connected directly to the comparators 1 and 2. Consequently, transistor $Z_1$ is turned on when $I_0 \geq I$ and $E \geq 0$.

Both comparators 1 and 2 are connected to the lower AND-gate 4 via logical inverters 5 and 6. Consequently, transistor $Z_2$ is turned on when $I_0 \leq I$ and $E \leq 0$.

U.S. Pat. No. 4,947,309 describes how comparator 2 can be modified into a "window comparator" that works in such a way that the logical inputs to AND-gate 3 and to AND-gate 4 both are a logical "1" when the bridge voltage E is close to zero Volt (0 V). This is in order to facilitate the start of the switch circuit. It has no importance for the present invention and is not described further.

FIG. 6 (prior art) shows time diagrams of the voltage E (the bridge voltage) at the bridge point and the current I through the inductor L. The inductor current I is created by the voltage difference (E-U) across the inductor. The inductor is designed to have very low losses and the resistance in the inductor winding is practically negligible. The inductance value L is dominating and the inductor current follows essentially the equation:

$$I = \int \frac{E-U}{L} dt$$

One single pulse has a very short time duration (typically 100 microseconds) and the voltage (E-U) is almost constant during this time. Consequently, the inductor current rises and falls along almost straight lines.

The upper transistor $Z_1$ is ON during the first part of the switch cycle and the bridge voltage E=+V. The inductor current rises linearly. The current I flows through the transistor $Z_0$ inside $Z_1$. When the inductor current reaches a reference level $I_0$ the upper transistor $Z_1$ is turned off. The lower transistor $Z_2$ remains OFF. The inductor current cannot be turned off abruptly, but creates a new way through the lower diode $D_0$ inside $Z_2$. The bridge voltage E drops from +V to −V. This is a very fast voltage step typically within less than 1 microsecond.

The voltage (E-U) is negative during the second part of the switch cycle and the inductor current decreases almost linearly towards zero.

The enlarged area inside FIG. 6 describes the process close to zero current. The diode $D_0$ is a power diode and it doesn't behave as an "ideal" diode. It cannot turn off abruptly when the current changes direction. It must receive a so-called "reverse recovery charge" before it turns off. This is a well-known phenomenon. The inductor current doesn't stop when it is exactly zero. It continues to follow the straight line and begins to flow in negative direction through the diode. This negative current supplies the reverse recovery charge to the diode. As soon as this charge has been delivered, the diode turns off, almost instantaneously.

This automatic "diode turn off" initiates a new switch cycle. Now there is a negative inductor current and this current cannot be stopped instantaneously. It creates a new way through the upper diode $D_0$ inside the upper transistor $Z_1$. This change of current flow forces the bridge voltage E to rise quickly from −V to +V. The whole switch process is very fast, typically a few microseconds. The quick rise of the bridge voltage can easily be detected by comparator 2 in FIG. 5. It is now perfectly safe to turn on the upper transistor $Z_1$ for a new switch cycle. The turn on of the upper transistor takes place when the current is essentially zero and the voltage across the transistor is essentially zero, which means that there are negligible switch losses during the turn on.

The input signal to the voltage comparator 2 changes very fast between +V and −V. The operation is very distinct and there is no uncertainty region or problem with noise.

The situation is different for the current comparator 1. The reference current $I_0$ is relatively stable but the measured current I may be distorted by noise. FIG. 7a (prior art) shows how comparator 1 can be modified to a hysteresis comparator. FIG. 7a with the corresponding component numbers is taken from FIG. 4 of U.S. Pat. No. 4,947,309. The two input signals −I and +$I_0$ are connected via resistors to the negative input of a comparator or a fast operational amplifier 24. A positive feedback signal is connected via the resistors 25 and 26 to the positive input of amplifier 25. This creates a hysteresis effect. A logic inverter 27 creates a correct polarity of the logic signal. The object of this hysteresis effect is to reduce noise sensitivity, which is well known.

FIG. 7b shows an alternative version of a hysteresis comparator. The input signal I is connected via a resistor 7 to the negative input of a comparator 9. The input signal $I_0$ is connected via a resistor 8 to the positive input of a comparator 9. The output of the comparator is limited by a limiter 12 to two fixed levels +ϵ and −ϵ. The output voltage +/−ϵ from the limiter 12 is attenuated by the combination of resistors 8, 10 and 11 to a value +/−$I_A$ at the input of comparator 9. It is this value that defines the hysteresis effect.

FIG. 7c shows the comparator output +/−$I_A$ as a function of the input current I. The reference current $I_0$ is supposed to be constant. The comparator output is +$I_A$ until the value of I is larger than $I_0$+$I_A$. Then the comparator reacts and switches the output to −$I_A$. This value remains stable until the value of I goes below $I_0$−$I_A$. Then the output value of the comparator goes back to +$I_A$.

It has surprisingly been found that the maximum switch frequency of the entire system can be controlled by the help of hysteresis in the current comparator.

FIG. 8a shows one complete switch cycle, the same as in FIG. 6 (Prior Art). Although not shown, the "automatic commutation" to a new switch cycle at zero current is assumed to be the same as in FIG. 6. The current comparator switches exactly when the inductor current has the same value as the reference value $I_0$. In other words, there is no hysteresis. The total cycle time is composed of the two times $T_1$ and $T_2$.

The peak to peak amplitude of inductor current during the two time periods $T_1$ and $T_2$, which are defined in FIG. 8a, can be calculated by help of FIG. 5. The inductor current starts from zero and increases to $I_0$. The bridge voltage E is positive as long as the upper transistor $Z_1$ is ON and it is negative when the lower transistor $Z_2$ is ON.

$$I_0 = \frac{E-U}{L} T_1 \qquad (1)$$

$$-I_0 = \frac{-E-U}{L} T_2 \qquad (2)$$

Solve for the time periods:

$$T_1 = \frac{L}{E-U} I_0 \qquad (3)$$

$$T_2 = \frac{L}{E+U} I_0 \qquad (4)$$

A complete switch cycle:

$$T_1 + T_2 = I_0 L \left( \frac{1}{E-U} + \frac{1}{E+U} \right) = I_0 L \frac{2E}{E^2-U^2} \qquad (5)$$

The switch frequency can be calculated as the inverse of the cycle time:

$$f = \frac{1}{T_1+T_2} = \frac{E^2-U^2}{2EI_0L} = \frac{E\left(1-\left(\frac{U}{E}\right)^2\right)}{2I_0L} \qquad (6)$$

The frequency f is inversely proportional to the peak amplitude $I_0$ of the current. The equation was obtained for a switch circuit according to FIG. 8a (prior art) without hysteresis.

Figure 8B:
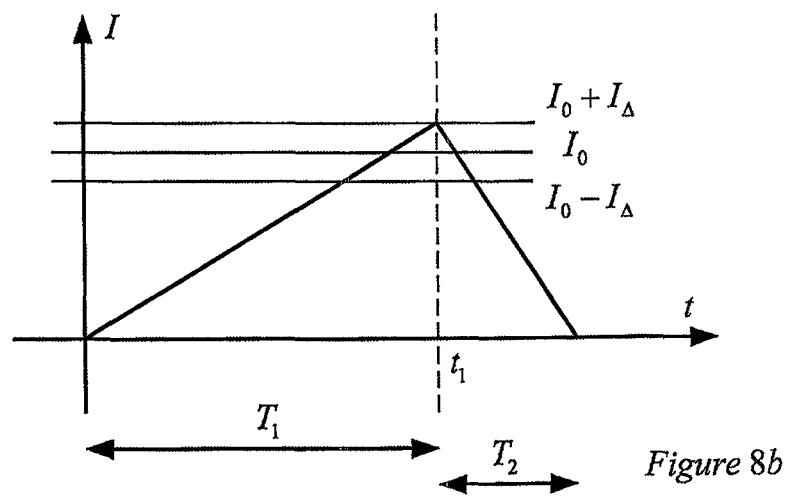
FIG. 8b is a time diagram similar to FIG. 8a but with added hysteresis.

FIG. 8b shows a similar switch cycle according to the present invention, now with hysteresis in the current comparator. The first part $T_1$ of the switch cycle ends at time $t_1$ when $I \geq I_0 + I_\Delta$. Below it is assumed that the hysteresis is symmetric around the reference current $I_0$ and is substantially constant.

It is the peak to peak amplitude of the current swing that determines the frequency.

The same is true when hysteresis is added to the system. The peak to peak amplitude in FIG. 8b is $(I_0+I_\Delta)$. The corresponding equation is:

$$f = \frac{1}{T_1+T_2} = \frac{E^2-U^2}{2E(I_0+I_\Delta)L} = \frac{E\left(1-\left(\frac{U}{E}\right)^2\right)}{2(I_0+I_\Delta)L} \qquad (7)$$

Equation (7) can be used to calculate the amplitude of current I for a given frequency:

$$I_0 + I_\Delta = \frac{E\left(1-\left(\frac{U}{E}\right)^2\right)}{2fL} \qquad (8)$$

This value has a maximum for U=0.

$$(I_0 + I_\Delta)_{max} = \frac{E}{2fL} \qquad (9)$$

Combination of equation (8) and (9) gives:

$$I_0 + I_\Delta = (I_0 + I_\Delta)_{max}\left(1-\left(\frac{U}{E}\right)^2\right) \qquad (10)$$

Figure 16:
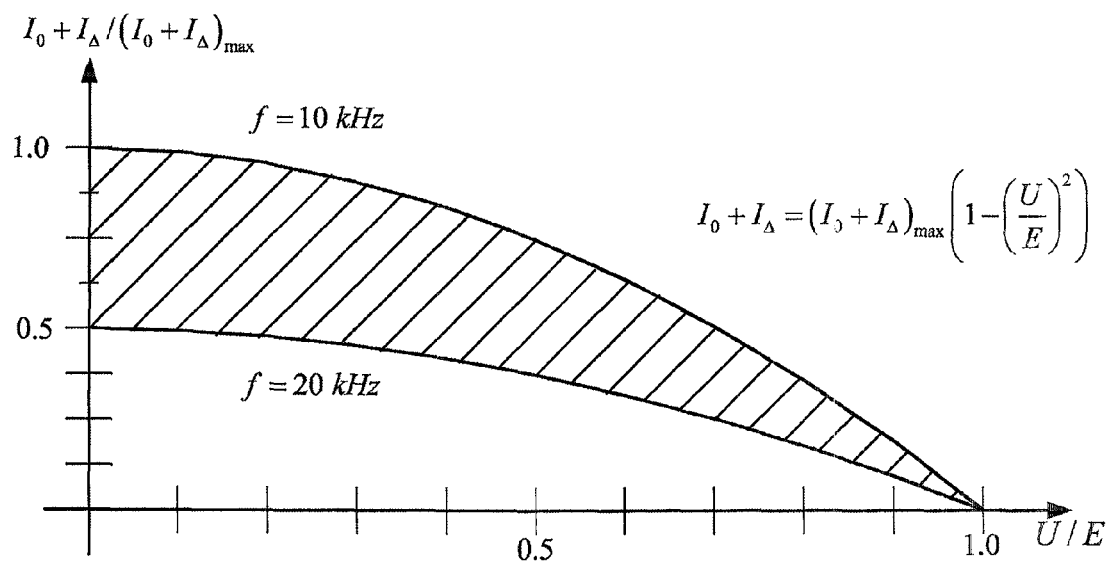
FIG. 16 is a graphic representation of equation (10).

FIG. 16 is a graphic representation of equation (10). It shows the amplitude of current I through the inductor for two fixed frequencies 10 kHz and 20 kHz. The frequencies are arbitrarily chosen as examples. The indicated area between these lines is the useful operating area for frequencies between 10 kHz and 20 kHz.

Although not shown here, the system operates exactly in the same way in four quadrants with all combinations of positive and negative voltages and currents.

The system may be unable to control low currents below the indicated area, if the switching frequency is limited to a maximum frequency $f_{max}$, which may be 20 kHz. It is the purpose of the present invention to create a new operating mode in this area. It will be defined as the "hysteresis control zone" and "hysteresis mode".

Figure 8C:
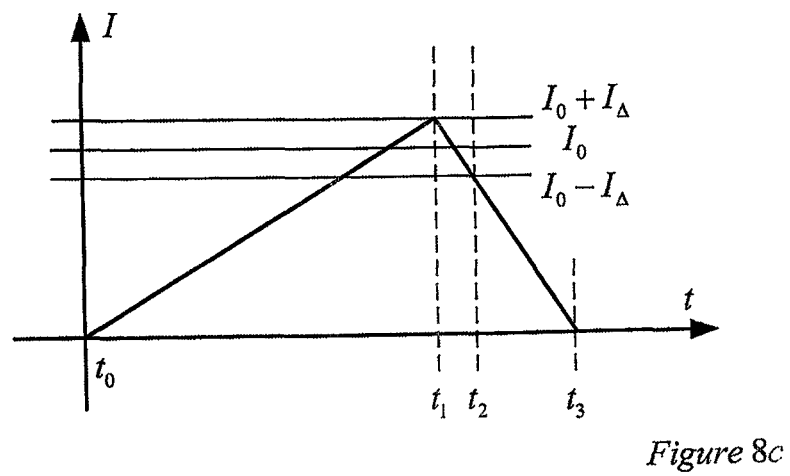
FIG. 8c is a time diagram similar to FIG. 8a and FIG. 8b and defines the switching instants.

FIG. 8c defines the switching instants. The total switch cycle starts at time $t_0$ and ends at time $t_3$. The current comparator switches at time $t_1$ and goes back to the original state at time $t_2$.

Figure 9:
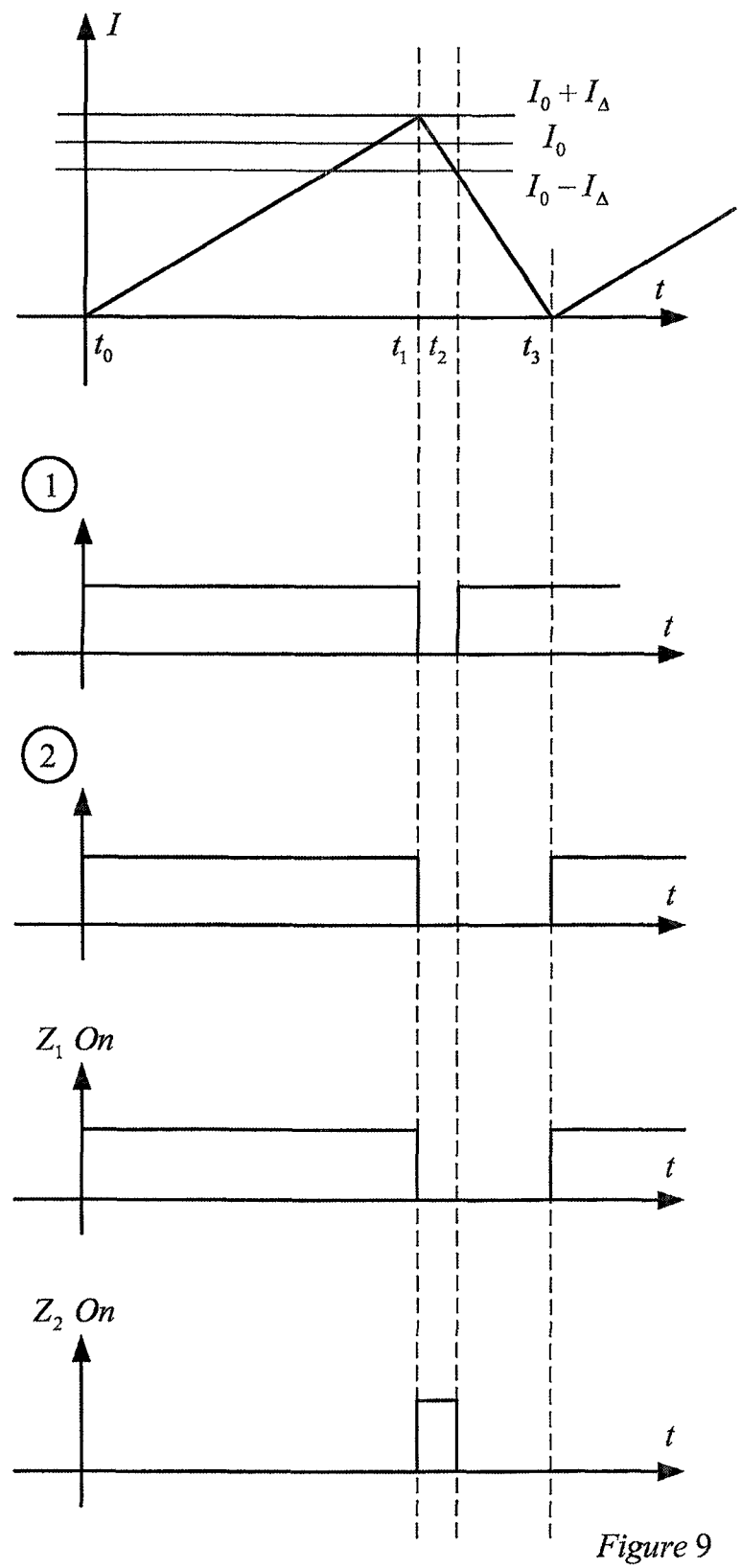
FIG. 9 is a time diagram, which shows the same switch cycle as FIG. 8c, together with time diagrams for some components in the switch system.

FIG. 9 shows the same switch cycle as FIG. 8c, now together with time diagrams for some components in the switch system.

In the diagrams, a high value=ON (logical state=1). A low value=OFF (logical state=0).

The current comparator 1 goes from the logical state "1" to state "0" between time $t_1$ and time $t_2$. The voltage comparator 2 goes from "1" to "0" between time $t_1$ and time $t_3$. The upper transistor $Z_1$ is ON between time $t_0$ and time $t_1$. The lower diode $D_0$ of $Z_2$ is conducting between time $t_1$ and time $t_3$. The lower transistor $Z_2$ is ON between time $t_1$ and time $t_2$. Both transistors are OFF between time $t_2$ and time $t_3$.

FIG. 5 (prior art) explains the logic function. The upper transistor $Z_1$ is ON when both the current comparator and the voltage comparator are "1". The lower transistor $Z_2$ is ON when both the current comparator and the voltage comparator are "0".

It should be noted that although the lower transistor $Z_2$ is ON, there flows no current in the transistor. The current direction is positive and consequently the current flows through the lower free-wheel diode $D_0$. See further below about conduction of the lower transistor.

The operation is the same as in the prior art according to FIG. 5, but the control current $I_0$ is replaced by $I_0+I_\Delta$.

Figure 10:
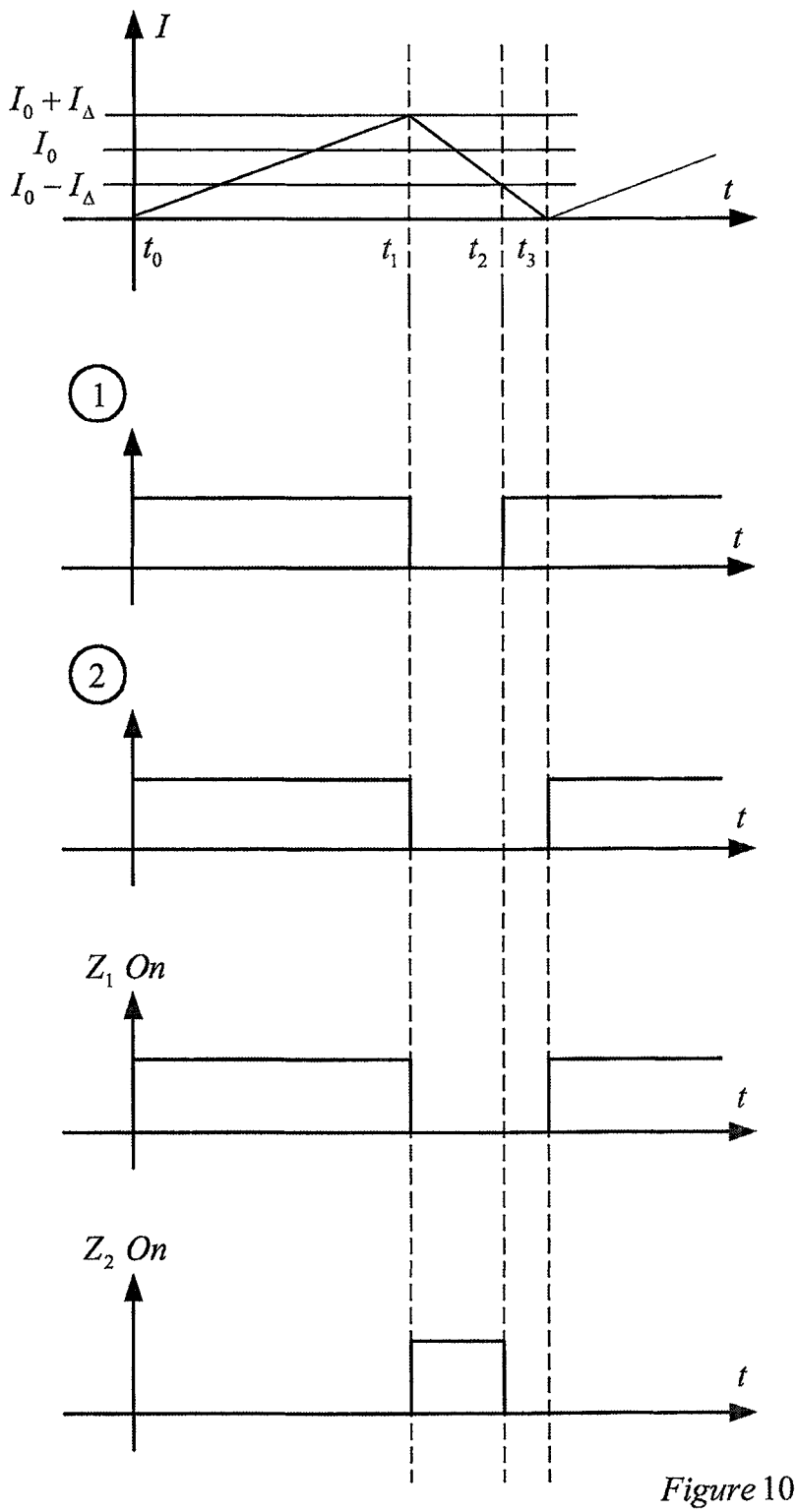
FIG. 10 is a time diagram similar to FIG. 9, wherein the current reference value is relatively small in comparison to the hysteresis.

FIG. 10 shows a similar case. Here the reference value $I_0$ is relatively small in comparison to the hysteresis $I_\Delta$. The operation is still the same. It can be seen that time $t_2$ is closer to $t_3$ than in FIG. 9.

Figure 11:
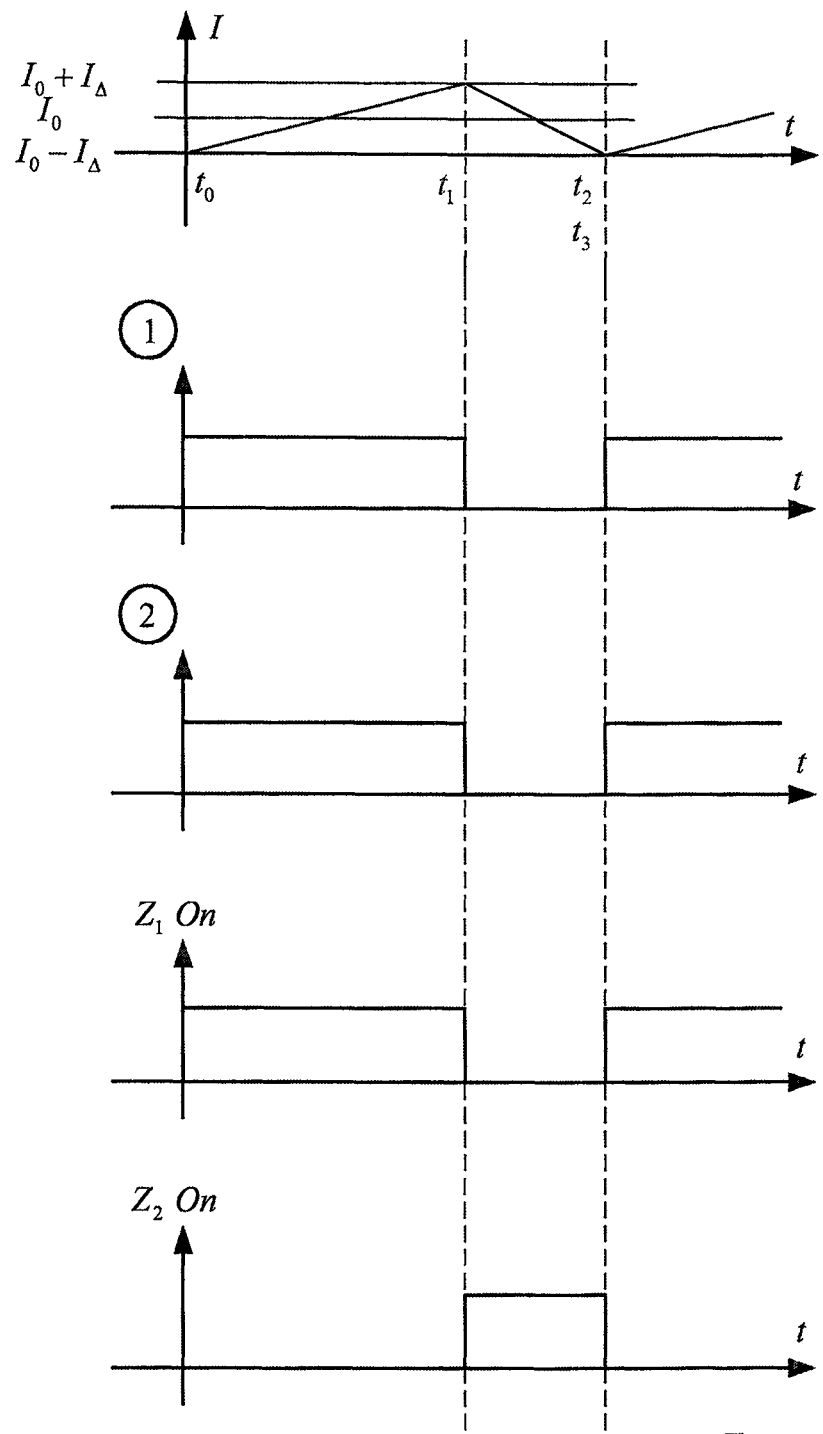
FIG. 11 is a time diagram similar to FIG. 9, where the current reference value is equal to the hysteresis value.

FIG. 11 shows a case where the reference value $I_0$ is equal to the hysteresis value $I_A$. Now time $t_2$ is the same as time $t_3$. The lower transistor $Z_2$ is ON all the time between time $t_1$ and time $t_3$. It should be noted, however, that the inductor current is positive all the time and consequently there flows no current through the transistor $Z_2$. The automatic commutation at zero current, by help of the reverse recovery phenomenon, takes place at the same time as $Z_2$ turns OFF and $Z_1$ turns ON. The system operates exactly at the limit between normal operation with automatic diode commutation and hysteresis operation.

Figure 12:
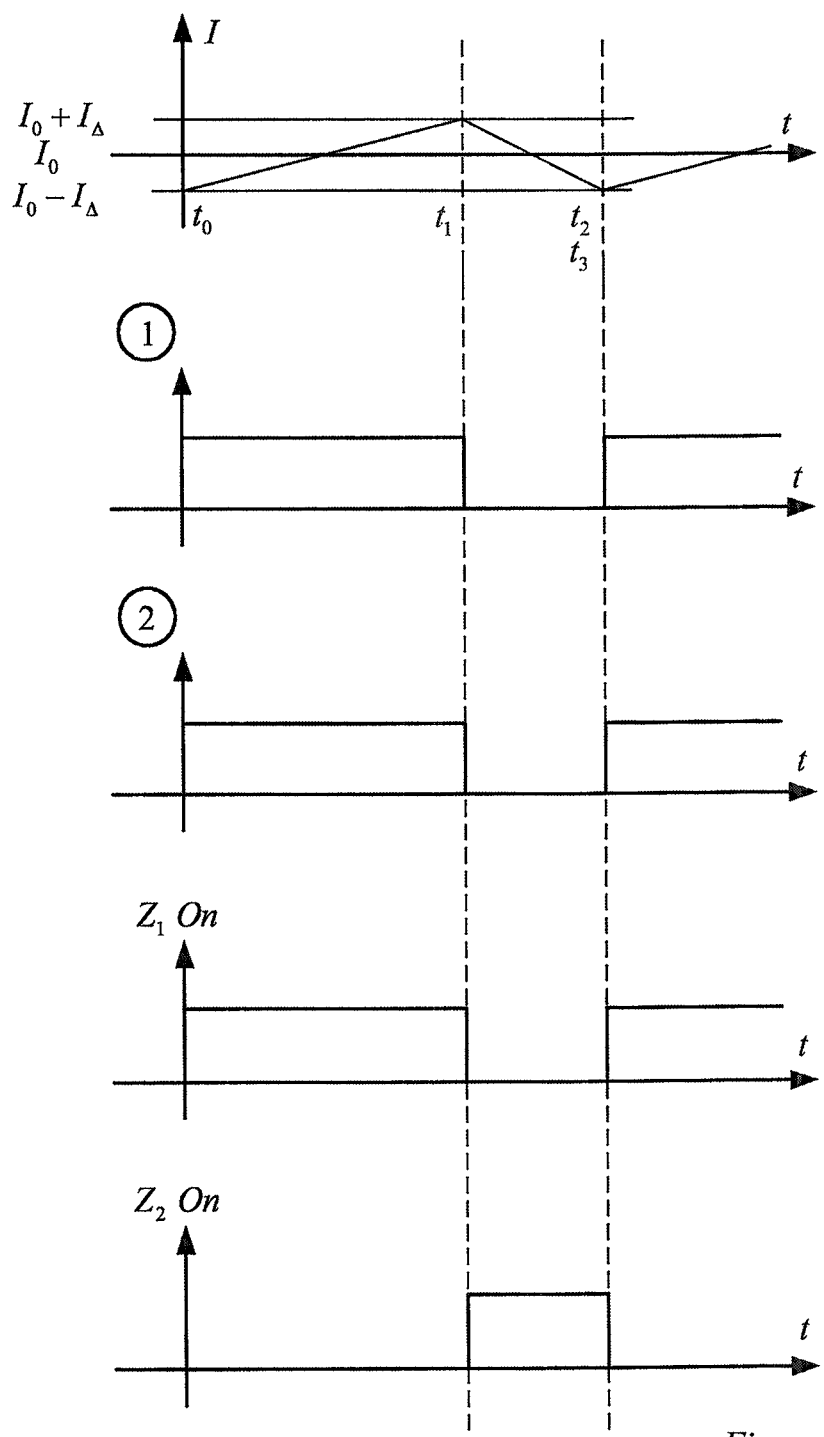
FIG. 12 is a time diagram similar to FIG. 9, with hysteresis operation.

FIG. 12 shows a situation with hysteresis operation. The reference current $I_0$ is exactly zero. Now there is a true AC current in the circuit as can be seen in the upper time diagram. The upper transistor $Z_1$ is ON between time $t_0$ and time $t_1$. The lower transistor $Z_2$ is ON between time $t_1$ and time $t_3$, which is equal to $t_2$. The inductor current I goes from negative to positive during the first half of the switch cycle. During the time between time $t_0$ and $t_1$, the current I flows through the upper free-wheel diode $D_0$ inside $Z_1$ as long as it is negative, i.e. close to $t_0$. It flows through the upper transistor $Z_0$ inside $Z_1$ as soon as it becomes positive, i.e. close to $t_1$. During the time between time $t_1$ and $t_3$, the current I flows through the lower free-wheel diode $D_0$ inside $Z_2$ as long as it is positive, i.e. close to $t_1$. It flows through the lower transistor $Z_0$ inside $Z_2$ as soon as it becomes negative, i.e. close to $t_3$. The peak to peak amplitude of the current is $2*I_A$.

A similar situation exists when the reference current $I_0$ is not zero, but smaller than the hysteresis current $I_A$.

Figure 13:
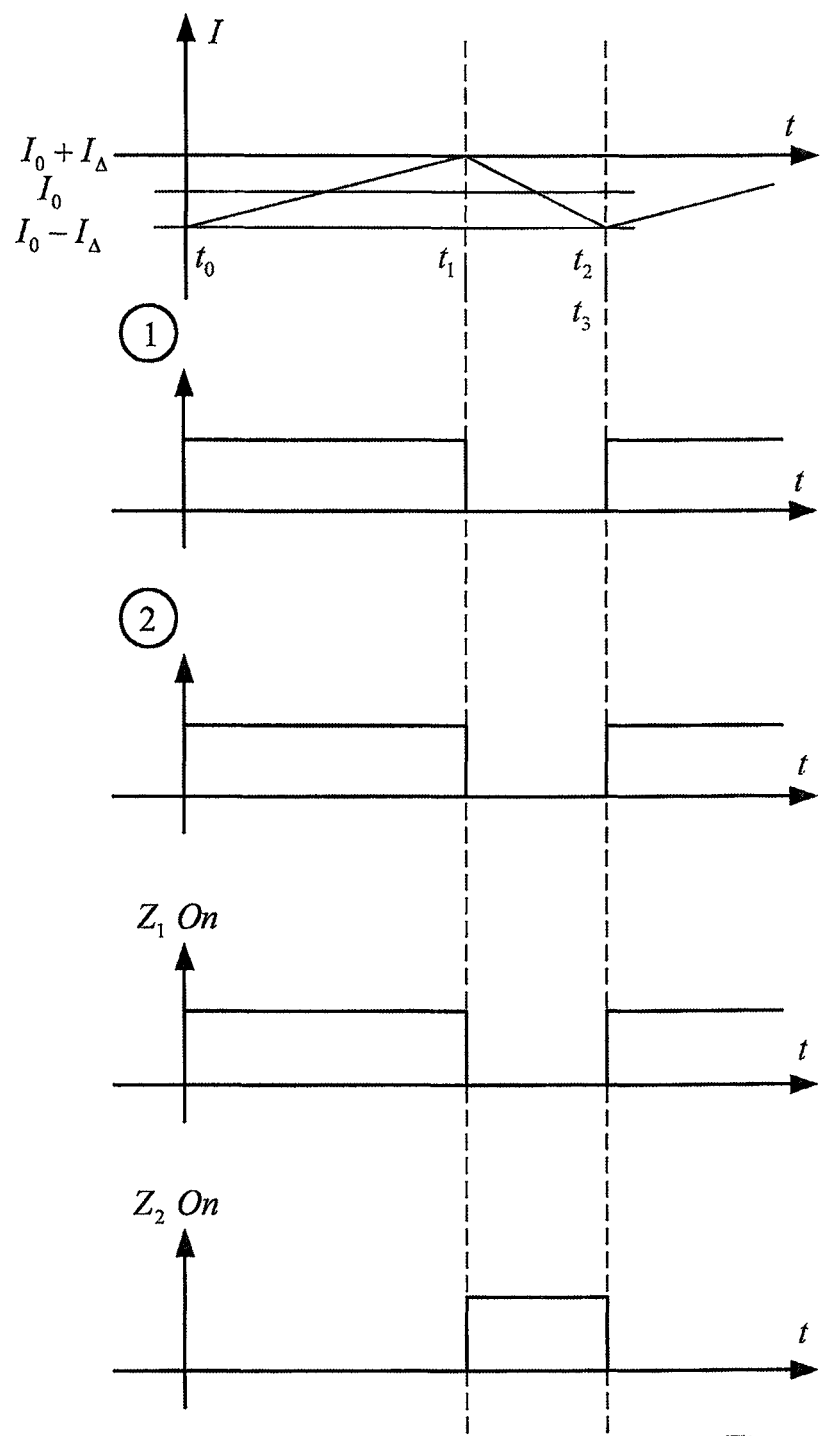
FIG. 13 is a time diagram similar to FIG. 11, where the reference current is equal to the negative hysteresis value.

FIG. 13 shows a case where the reference current $I_0$ is equal to the negative hysteresis value $-I_A$. This is similar to the case in FIG. 11, however with negative inductor current all the time. Here the automatic commutation at zero current takes place at time $t_1$ and not at time $t_3$.

The series of Figures from number 9 to 13 shows that the switch circuit operates in "normal" mode as soon as $I_0 \geq I_A$ or $I_0 \leq -I_A$. It operates in "hysteresis" mode only when $I_A \geq I_0 \geq -I_A$.

The slope (rate of change) of the inductor current I is normally not the same during the first part of the switch cycle and during the second part. The slope depends on the voltage (E-U) across the inductor. FIG. 13 shows a case where the voltage U is positive. The first part of the switch cycle has a lower slope than the second part. At the same time the inductor current I is negative. The product of output voltage and current (U*I) is negative and the circuit operates in regenerative mode. Electric energy goes from the load back to the switch circuit. This may happen with an inductive load and it happens with an electric motor drive when the motor brakes.

Figure 14:
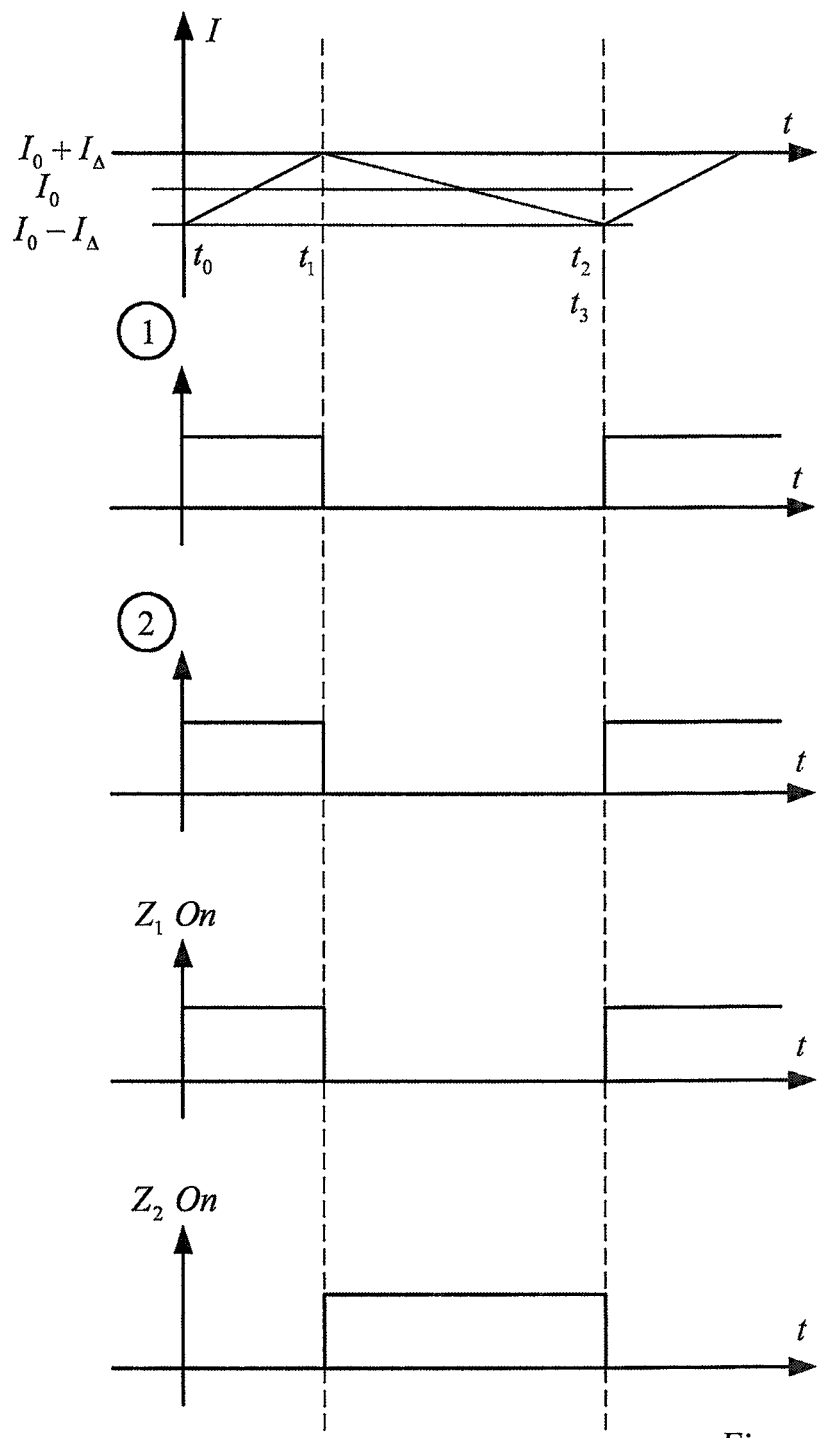
FIG. 14 is a time diagram similar to FIG. 13, but now the output voltage is negative.

FIG. 14 shows the same sequence as FIG. 13 but now the output voltage U is negative. This results in a faster slope during the first part of the switch cycle. This is typical for a (normal) resistive load where the product (U*I) is positive.

Figure 15:
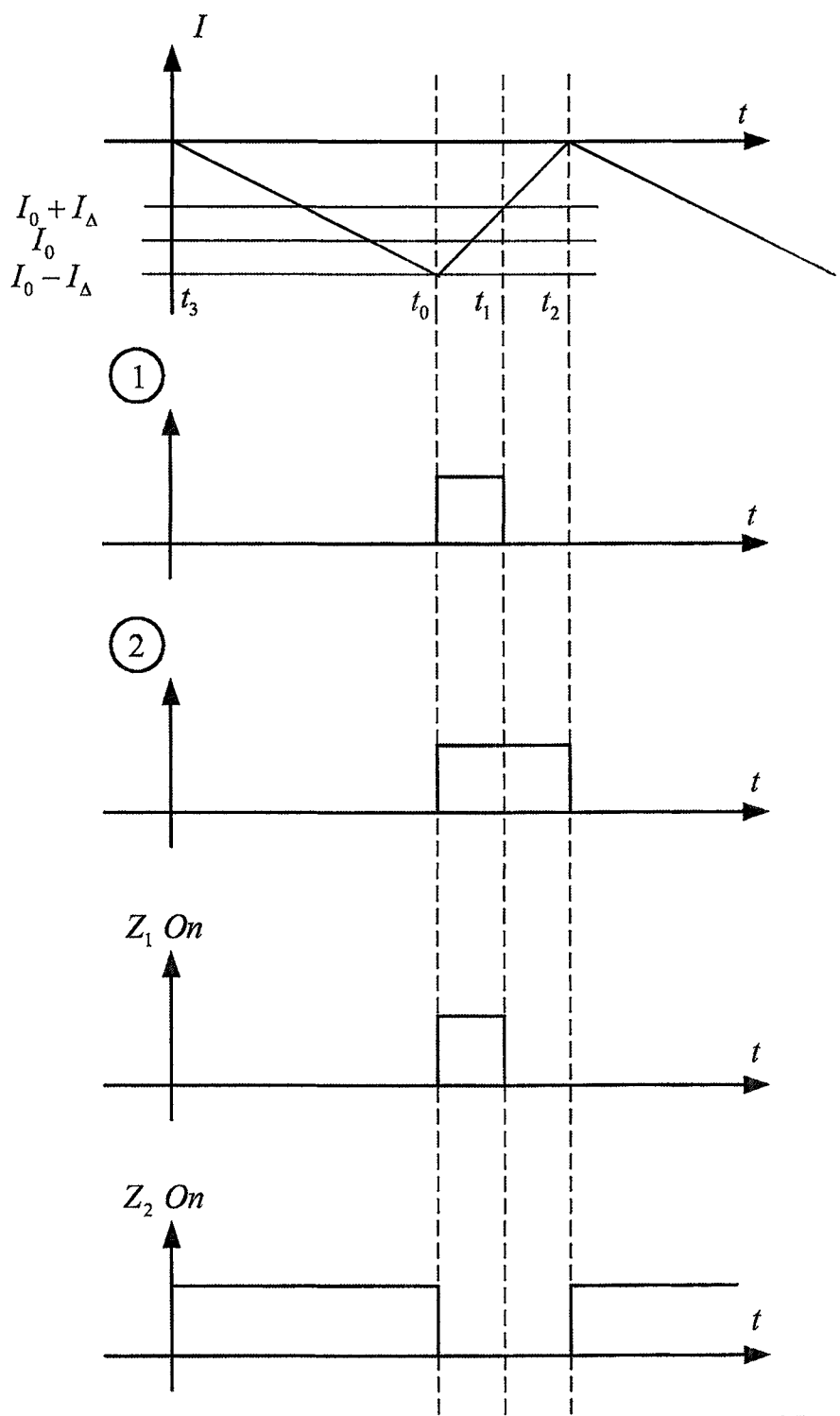
FIG. 15 is a time diagram similar to FIG. 9, but all the functions are inverted.

FIG. 15, finally, shows a case similar to FIG. 9, but all the functions are inverted. Both the output voltage U and the inductor current I are negative.

The peak to peak amplitude of the inductor current I is constant inside the hysteresis zone according to FIGS. 11, 12 and 13. The system will automatically enter this zone when the reference current $|I_0| \leq I_A$ and it will automatically leave the zone when $|I_0| \geq I_A$.

The switch frequency inside the hysteresis control zone is defined by the peak to peak amplitude of the inductor current.

The peak to peak amplitude is $2*I_A$. Consequently the hysteresis frequency $f_h$ can be calculated according to equation (6):

$$f_h = \frac{E\left(1 - \left(\frac{U}{E}\right)^2\right)}{4I_A L} \qquad (11)$$

Rearrange the equation:

$$f_h I_A = \frac{E\left(1 - \left(\frac{U}{E}\right)^2\right)}{4L} \qquad (12)$$

The right hand side of the equation is a function of the variable output voltage U. The left hand side must follow the variations. The system designer has two alternatives, either to keep the amplitude of $I_A$ constant and let the hysteresis frequency $f_h$ be variable as a function of U, or to keep $f_h$ constant and let $I_A$ be variable. Of course it would also be possible to design a mix of these two alternatives but this will not be discussed further.

A first alternative is to keep the amplitude of $I_A$ constant and make $f_h$ variable. Define the hysteresis frequency $f_h$ as a function of U:

$$f_h = f_{max}\left(1 - \left(\frac{U}{E}\right)^2\right) \qquad (13)$$

Now it is possible to calculate the constant value of $I_A$:

$$I_A = \frac{E\left(1 - \left(\frac{U}{E}\right)^2\right)}{4L f_h} = \frac{E}{4L f_{max}} \qquad (14)$$

Figure 27:
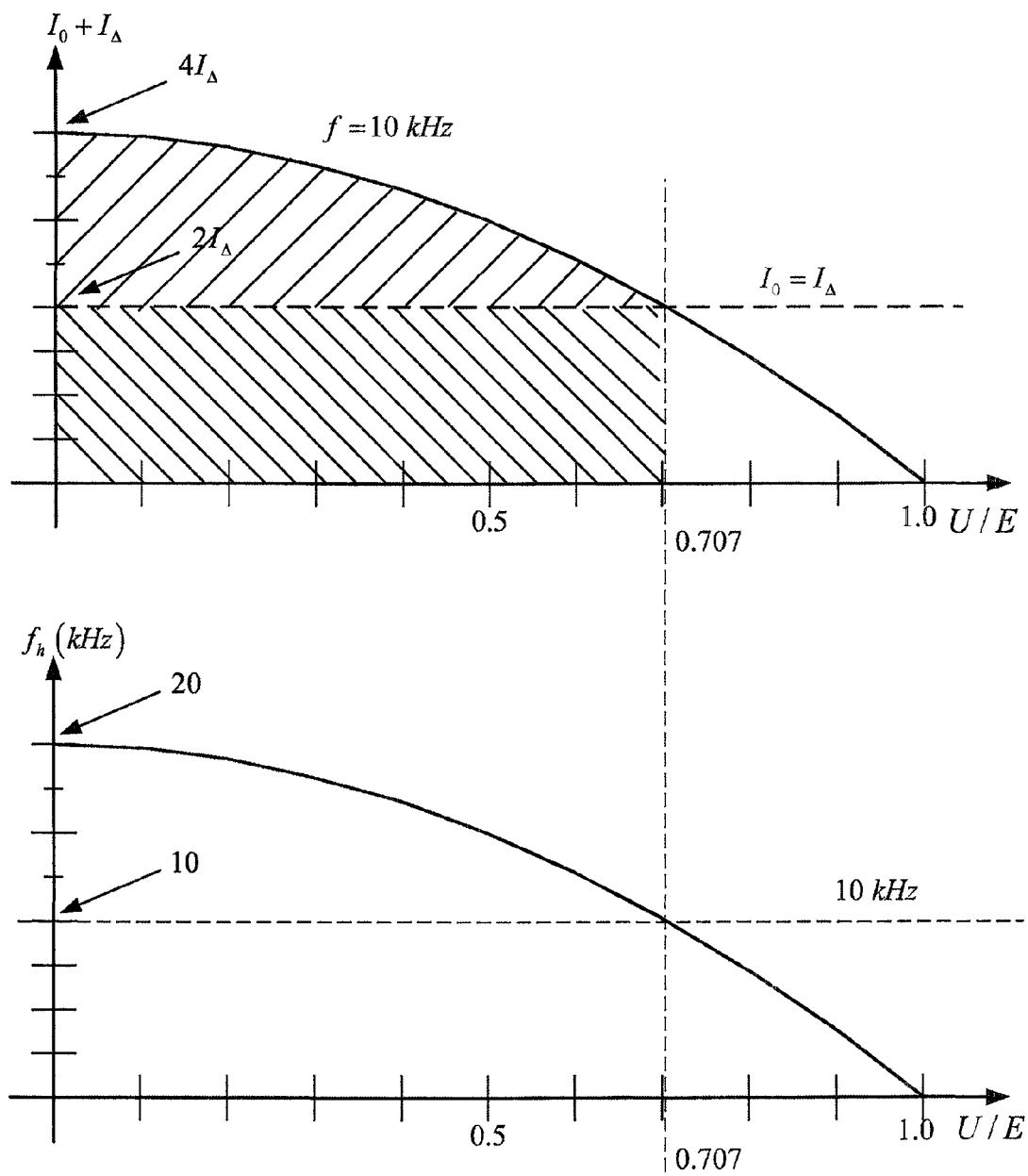
FIG. 27 is a diagram, which describes a first operating mode.

FIG. 27 describes this operating mode. It is based on the condition that the switch frequencies are limited between 10 kHz and 20 kHz. The upper diagram is essentially the same as the diagram in FIG. 16. The vertical axis indicates the inductor current $I_0+I_A$ and has been graduated with multiples of the hysteresis amplitude $I_A$. The lower frequency limit 20 kHz has been replaced by a horizontal line that indicates the transition from the normal "soft switching" mode above the line to the hysteresis mode below the line.

There are two different restrictions regarding the switching process:

The frequencies are limited to a range between 10 kHz and 20 kHz.

The hysteresis mode starts when $I_0 = I_A$.

As a consequence of this:

The hysteresis mode starts at 20 kHz when $I_0 + I_A = 2*I_0$

The maximum current amplitude is $4*I_A$ when U/E=0 and f=10 kHz

The lower diagram shows the switching frequency inside the hysteresis zone as a function of U/E.

The function $$\left(1-\left(\frac{U}{E}\right)^2\right)$$

has the value 0.5 for U/E=0.707.

The broken line in the upper diagram labeled $I_0=I_A$ crosses the 10 kHz line when U/E=0.707. This means that the system cannot operate above U/E=0.707 because the switching frequency would then be lower than 10 kHz. The lower shaded area for the hysteresis mode has the same upper limit at U/E=0.707. The reason for this limitation is that the switch frequency according to the lower diagram would be lower than 10 kHz when U/E≥0.707.

To conclude, there is a quite complex relation between the amplitude and frequency at the limit between the normal and the hysteresis operating zone as long as the value of $I_A$ is constant. The operating areas can be extended if the frequency swing is increased.

A second alternative keeps the hysteresis frequency $f_h$ constant and makes the amplitude of $I_A$ variable.

Define the hysteresis frequency $f_h$ as a constant frequency $f_h=f_{max}$ for all values of U. Now it is possible to calculate the hysteresis amplitude $I_A$ as a function of U:

$$I_\Delta = \frac{E\left(1-\left(\frac{U}{E}\right)^2\right)}{4Lf_{max}} \quad (15)$$

Figure 28:
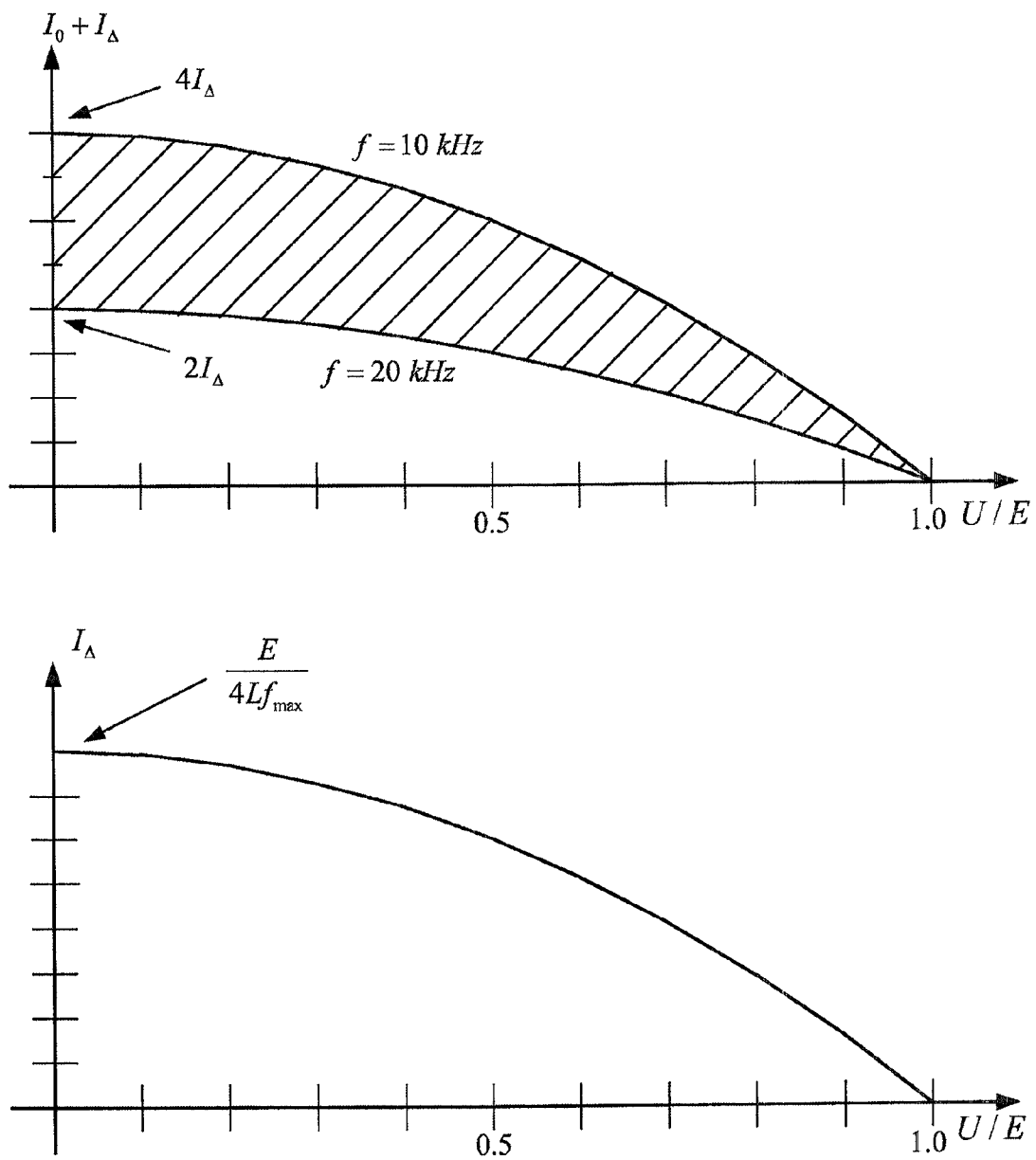
FIG. 28 is a diagram, which describes a second operating mode.

FIG. 28 illustrates the operating areas. The upper diagram is essentially the same as the diagram in FIG. 16. The vertical axis indicates the inductor current $I_0+I_A$ and has been graduated with multiples of the hysteresis amplitude $I_A$. The shaded area indicates the normal mode of operation with soft switching. The white area below the 20 kHz line indicates the mode of operation with hysteresis switching. The lower diagram shows the amplitude of the hysteresis current $I_A$ as a function of U. Theoretically, the system can operated in the whole area up to U/E=1.0. However, in a practical application, the operation may be limited to below about U/E=0.8.

In the above examples, it is supposed that the hysteresis is symmetrical. However, an upper hysteresis limit $I_{A+}$ does not need to be the same as a lower hysteresis limit $I_{A-}$. For example, the upper hysteresis limit $I_{A+}$ may be double as large as the lower hysteresis limit $I_{A-}$. Further alternatives are discussed below.

It is observed that the circuit enters hysteresis mode exactly at the time instant when the time $t_2$ equals time $t_3$. This hysteresis time instant is determined when the lower hysteresis limit $(I_0-I_{A-})$ becomes zero. Thus, if the lower hysteresis limit is independent of the upper hysteresis limit, the hysteresis operation can be induced independently of the upper hysteresis limit $I_{A+}$.

There are many other possible options for operating the switch circuit with hysteresis mode, as will be further described below.

The actual application of the switch circuit will decide which solution to choose. Constant amplitude of the hysteresis value $I_A$ gives a variable frequency in the hysteresis zone. A constant value of the hysteresis frequency gives a variable value of the hysteresis current $I_A$. The hysteresis value may be designed according to a special formula for certain applications.

A solution would be to choose a system that minimizes the losses in the system or simplifies the system, or any other consideration. This must be decided from case to case.

A practical example may be based on equation (11). Assume that a system operates from three-phase 400 V RMS AC. The rectified DC-link voltage will be 560 V. The plus bus +V will be +280 V and the minus bus −V will be −280 V. The bridge voltage E between the switch transistors changes between +280 V and −280 V. The small voltage drops in the transistors can be neglected. Consequently E=280 V.

Calculate for the simplest case when the output voltage U=0. Assume that the peak value of the triangular saw-tooth current at 10 kHz is 100 A and consequently 50 A at 20 kHz. The hysteresis zone is intended to limit the frequency to 20 kHz. Then $2*I_A$=50 A, according to equation (13), resulting in $I_A$=25 A Rearranging equation (11) gives (for U=0):

$$L = \frac{E\left(1-\left(\frac{U}{E}\right)^2\right)}{4I_\Delta f} = \frac{280}{4*25*20000} = 140*10^{-6} = 140 \, \mu H \quad (16)$$

The maximum peak value of the triangular saw-tooth current is 100 A at 10 kHz and U=0 but is only 50 A at 10 kHz and U/E=0.707.

In the first option, the hysteresis current is defined as $I_A$=25 A and is constant during the entire operation of the circuit. As soon as the amplitude $(I_0+I_A)$ of the current I through the inductor is below $2*I_A$=50 A, the circuit operates in hysteresis mode, independently of the frequency.

In the second option, the hysteresis current is dynamic and is $I_A$=25 A at U=0 and decreases as U increases. $I_A$=12.5 A when U/E=0.707.

A closer analysis of the switch circuit reveals that the "current gain" is different in the normal operating zone and in the hysteresis zone.

The inductor current has a triangular shape in the normal zone and consequently the mean value $I_{mean}$ is approximately 50% of the peak value. The current gain can be defined as 0.5.

An exact expression:

$$\text{Gain} = \frac{I_{mean}}{I_0} = \frac{(I_0+I_\Delta)/2}{I_0} = 0.5 + \frac{I_\Delta}{2I_0} \quad (17)$$

This equation is valid for $I_0$ larger than $I_A$. Thus, the gain increases from 0.5 for large $I_0$ to 1.0 when the $I_0=I_A$.

According to FIG. 11 the peak current is $2*I_A$ when the control signal $I_0=I_A$. The mean value of this current is $I_A$. Consequently, the gain inside the hysteresis zone is exactly=1.0.

Figure 17:
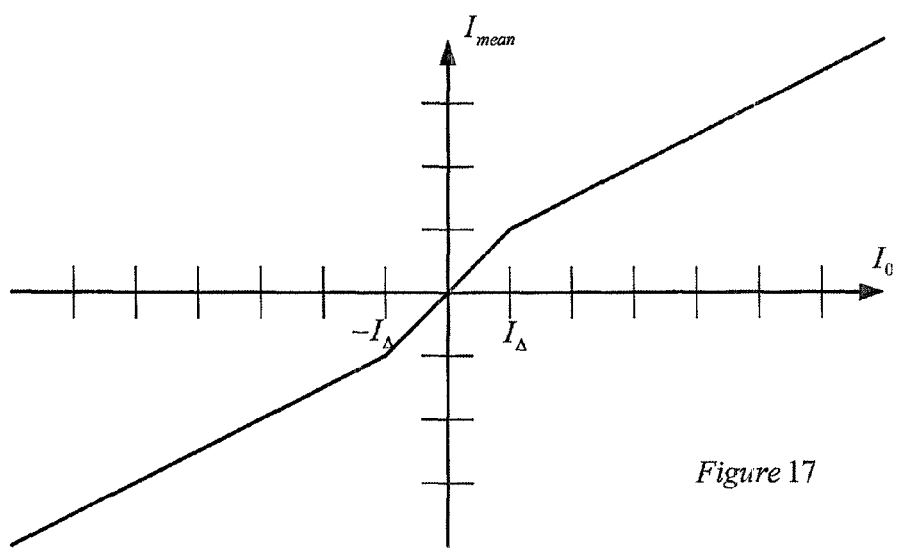
FIG. 17 is a diagram, which shows the nonlinear gain of the system.

FIG. 17 illustrates the nonlinear gain. Normally the switch circuit is used in a closed loop system for control of the output voltage. The nonlinear gain of the switch circuit will be part of the control loop. This may reduce the stability margin in the closed loop system. However, the gain is doubled at the same time as the switching frequency has its maximum value. The switch circuit will have a faster response and less phase shift with a higher switch frequency.

Consequently, the higher gain is partly compensated by less phase shift in the switch circuit.

It would be possible to compensate for the nonlinear switch gain by a nonlinear gain block in the control loop that is inversely proportional to the nonlinear gain in the switch circuit.

A practical realization of the switch circuit may be designed to minimize the total losses in the complete circuit. A higher switch frequency gives lower current amplitude in the hysteresis zone. The switching losses in the transistors, the conducting losses in the transistors, the iron losses and the copper losses in the inductor must be considered.

The switch circuit according to the present invention may be used not only with IGBT transistors but with MOSFET transistors as well. Then, the system may operate with significantly higher switch frequencies with MOSFET transistors, resulting in smaller filter components (L and C).

The hysteresis function, as described in FIG. 7, may be realized with analog signal circuits. It may, however, alternatively be realized in software in some kind of digital microprocessor, signal processor or FPGA (Field Programmable Gate Array).

Figure 18:
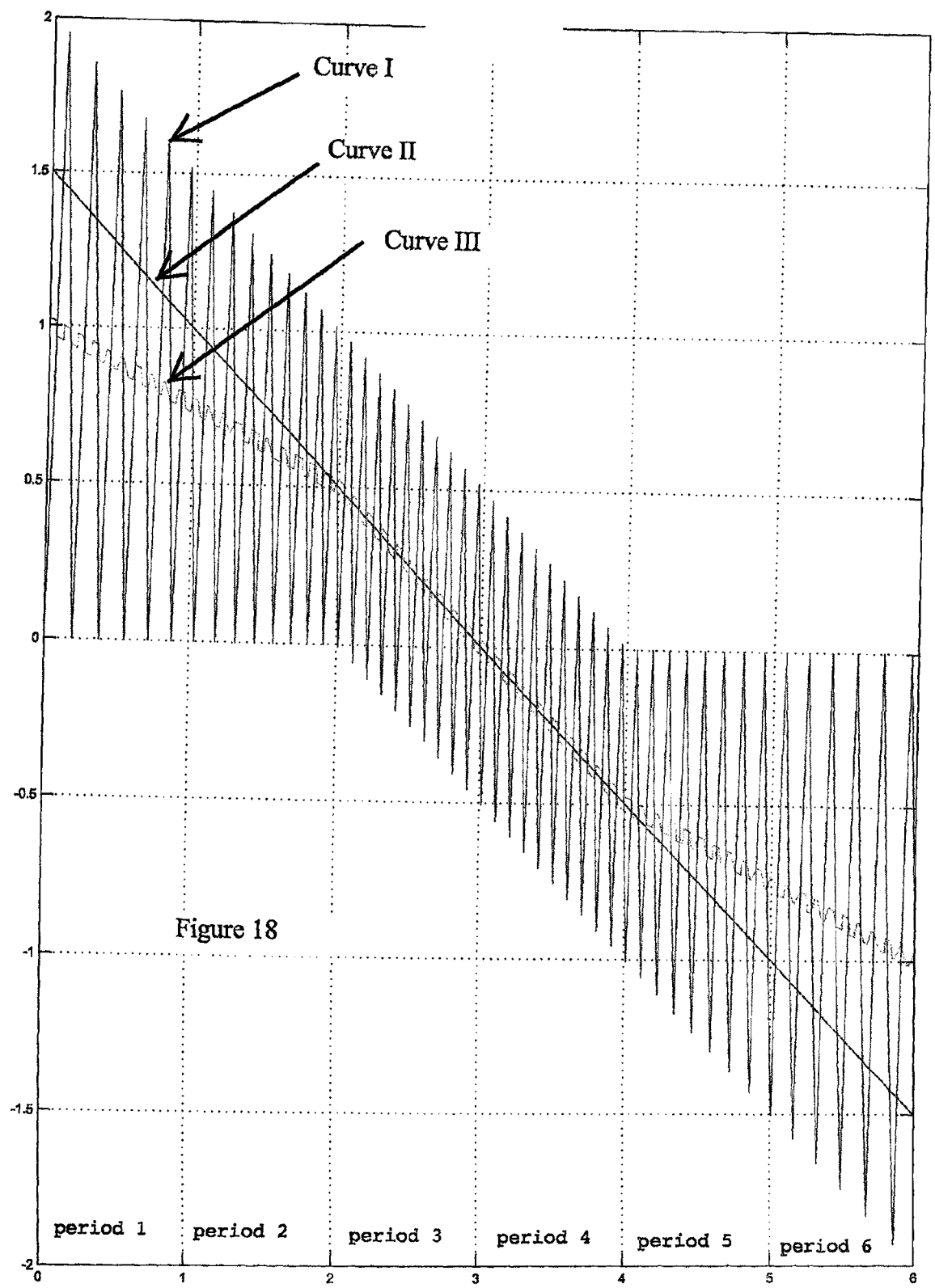
FIG. 18 is a time diagram, which shows the operation of an embodiment.

FIG. 18 is a diagram showing the operation of an embodiment when the reference value $I_0$ decreases from 1.5 A to −1.5 A. The hysteresis value is 0.5 A and is symmetrical. The operation is monitored during 6 time periods, wherein each time period may be approximately 0.5 msec. The current I in the inductor L is shown by curve I, the reference value $I_0$ is shown by curve II and the average output current to the load is shown by curve III. A low amplitude square wave has been added to curve III in order to separate it from the other curves.

During the first two time periods, the operation is in the soft-switching mode. The upper transistor is switched off when the current I in the inductor reaches the reference value $I_0$ plus the upper hysteresis value $I_{A+}$ and the upper transistor is switched on when the current is zero. It can be seen that the switch frequency is smaller at higher reference value ($I_0+I_{A+}$) in the first period and larger in the second time period.

During the third time period, the operation is in the hysteresis mode with positive reference value $I_0$ and during the fourth time period, the operation is in the hysteresis mode with negative reference value $I_0$. The circuit enters hysteresis mode when the lower hysteresis limit becomes zero or negative. As can be seen in FIG. 18, the frequency of oscillations is almost constant during the hysteresis mode and is higher than in the other time periods. The diagrams in FIG. 18 and FIG. 19 have been made with the output voltage U=0. The conditions will be slightly different for other values of U and depending on the mode of operation.

During time periods five and six, the situation is the opposite compared to time periods two and one, with negative reference value ($I_0-I_{A-}$).

Figure 19:
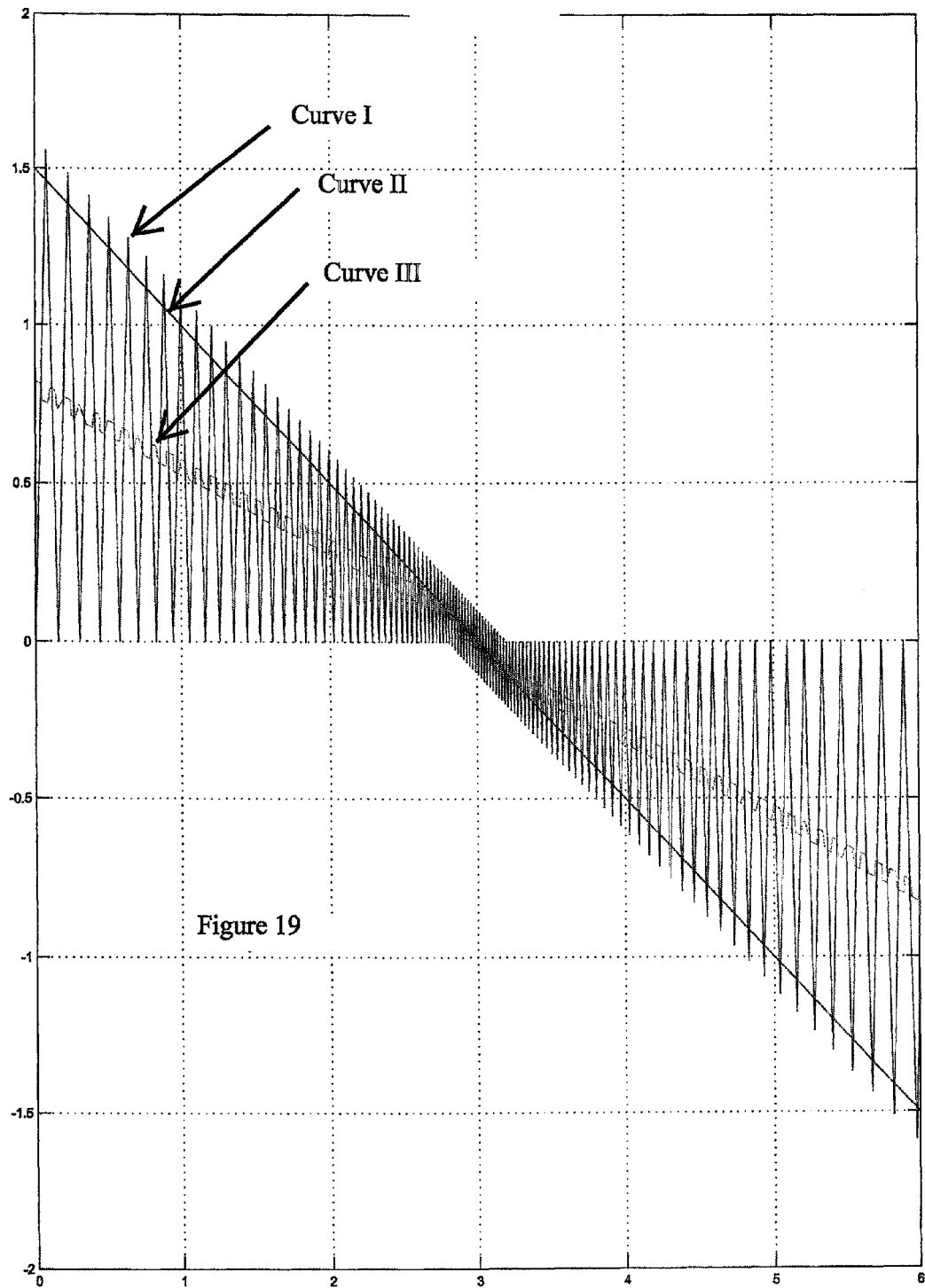
FIG. 19 is a time diagram, which shows the operation of another embodiment.

FIG. 19 is a diagram similar to FIG. 18, but with a lower hysteresis limit of 0.1 A. The hysteresis area is smaller compared to FIG. 18 and takes place at a higher frequency and lower amplitude. In FIG. 19, the increase in frequency at lower reference value $I_0$ is clearly visible.

In the embodiments described above, the hysteresis current $I_A$ has been symmetric around the control current $I_0$. In an alternative embodiment, the hysteresis currents can be different above and below the control current. It is noted in FIG. 9 that the lower transistor $Z_2$ is ON between time $t_1$ and time $t_2$. When the switch transistor is a MOSFET, the switch on of the lower transistor will result in that the lower transistor is conducting in the "wrong" direction in parallel with the diode. This will reduce power dissipation, which may be an advantage, at least at high currents since the combined resistance will be half of the resistance of the diode if the resistance of the transistor is equally large as the diode. Thus, the time period between time $t_1$ and time $t_2$ may be designed to be as long as possible. This can safely be performed by increasing the lower hysteresis limit. In this case, the time $t_2$ will approach time $t_3$ and the ON-time of the lower transistor will be maximized. This operation takes place during soft switching and ceases in the hysteresis mode.

Figure 20:
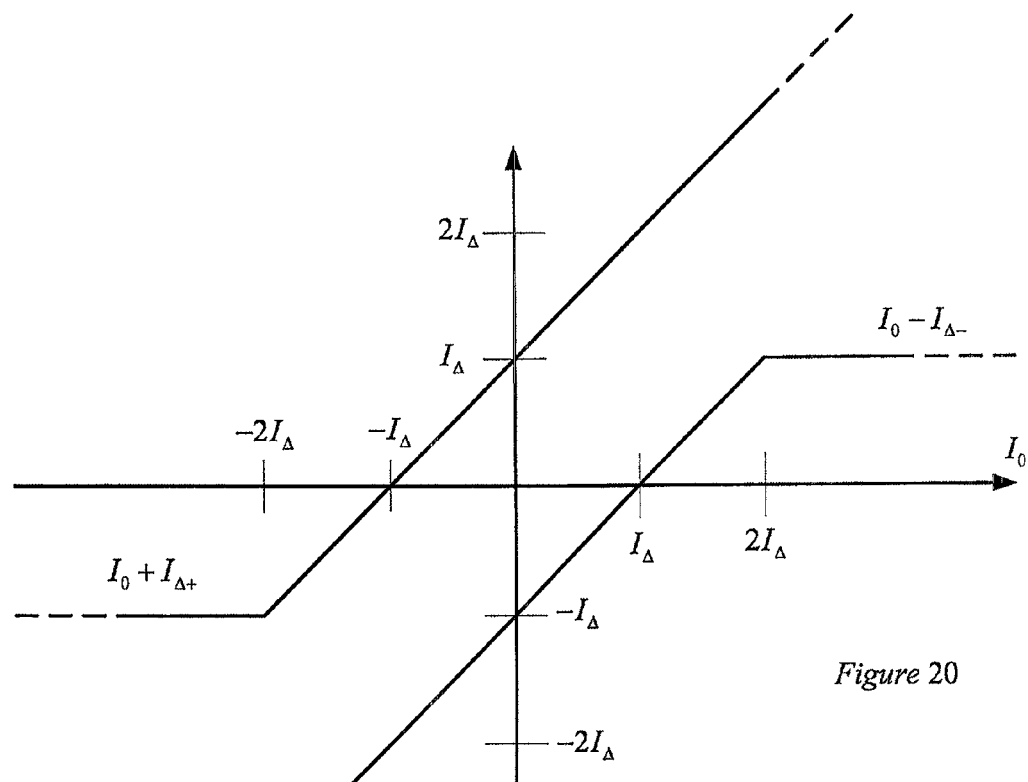
FIG. 20 is a diagram over hysteresis limits in an embodiment.

FIG. 20 shows such a situation wherein the upper hysteresis limit $I_{A+}$ is constant and equal to $I_A$ as indicated in the above embodiments. Study the case when $I_0$ is positive. The lower limit $I_{A-}$ is dynamic and $I_{A-}=I_0-I_L$, where $I_L$ may be equal to $I_A$ as shown in FIG. 20, or any other predetermined value, such as 1 A. Thus, the time $t_2$ when the current comparator switches on again will be moved to the right in FIG. 9, since the low hysteresis limit ($I_0-I_{A-}$) becomes constant equal to $I_L$ independently of $I_0$, i.e. ($I_0-I_{A-}$)=$I_0-(I_A-I_L)=I_L$ When $I_0$ becomes lower than $2*I_A$ the same operation as in FIG. 10 takes over, i.e. $I_A=I_A$. Similar limitations take place at the negative side. Such operation can be implemented by a digital control device and can also be implemented by analog circuits.

Figure 21:
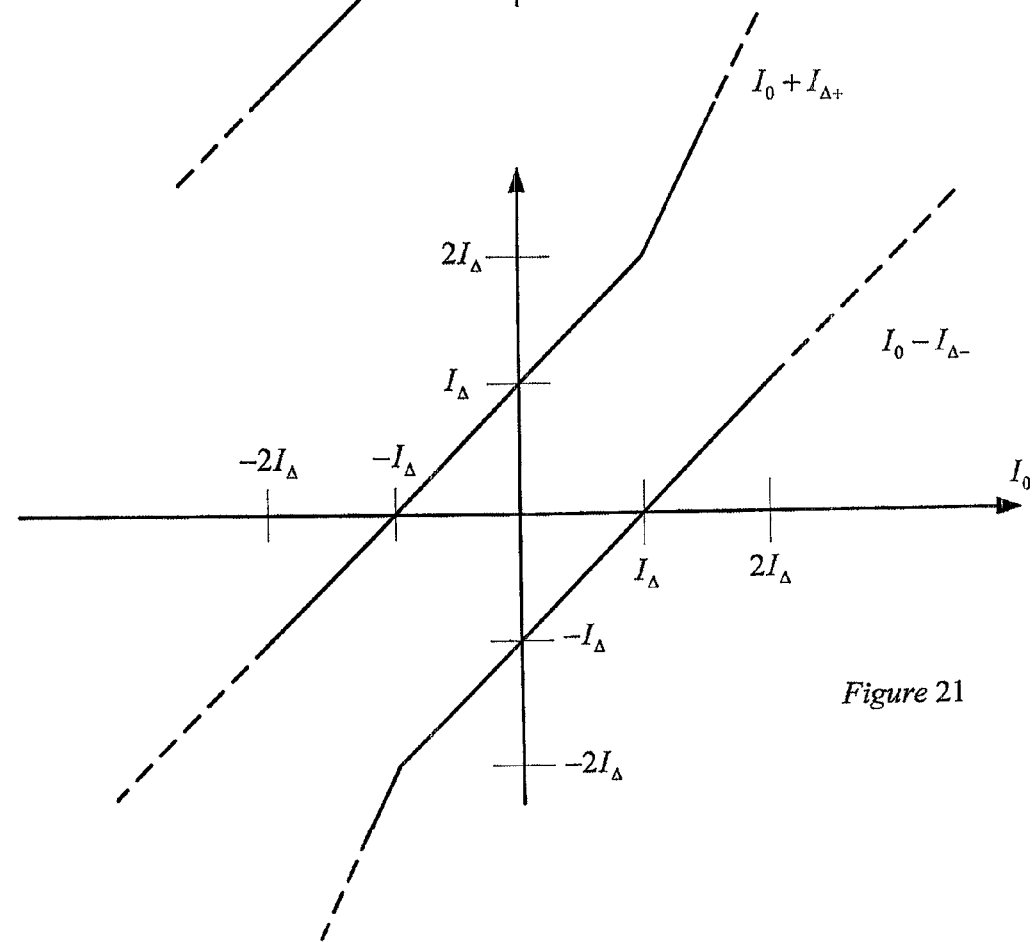
FIG. 21 is a diagram over hysteresis limits in another embodiment.

If it is desired to have substantially constant gain over the entire operation area, this can be achieved by having the upper hysteresis level non-constant as shown in FIG. 21. For example, if the upper hysteresis limit $I_{A+}$ is equal to $I_0$, but never smaller than $I_A$, the gain in the operation mode according to FIG. 9 will have a gain of unity over the entire control area. The lower hysteresis limit $I_{A-}$ may be constant or may also be dynamic as mentioned in connection with FIG. 20. A combination of these operation modes is shown in FIG. 22 and FIG. 23. The areas A will extend the time the "lower" transistor is ON, while the areas B will make the gain linear.

Figure 24:
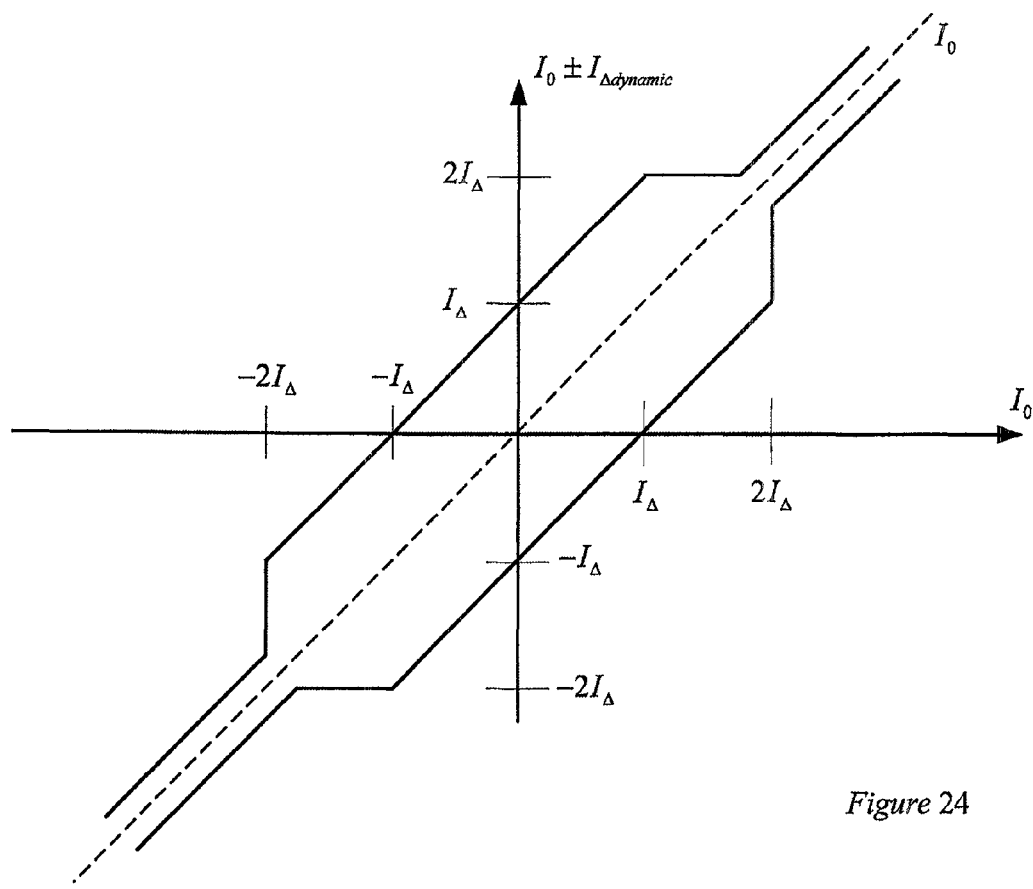
FIG. 24 is a diagram over hysteresis limits in a still further embodiment.

In addition, it may be advantageous to prevent that the lower transistor is fired at all. This may be achieved by making the time between time $t_1$ and $t_2$ as small as possible. This may be advantageous when using transistors of the IGBT type, wherein power is consumed by the circuits driving the transistor ON and OFF. This is accomplished by making the hysteresis current $I_A$ as small as possible at higher currents I0 as shown in FIG. 24. Alternatively or additionally, it would be possible to use an extra logical gate in the signal circuit that prevents the lower transistor from turning on when the reference value for inductor current is above a certain level, and vice versa for negative currents.

At high currents, the situation may arise that the switching frequency becomes low. In addition, the maximum current allowed for a transistor may be exceeded, since the maximum current through the transistor is twice the output current. In this situation, the embodiments can be modified to switch on the upper transistor before the current reaches zero, viz. when the current reaches the bottom hysteresis limit.

Figure 25A:
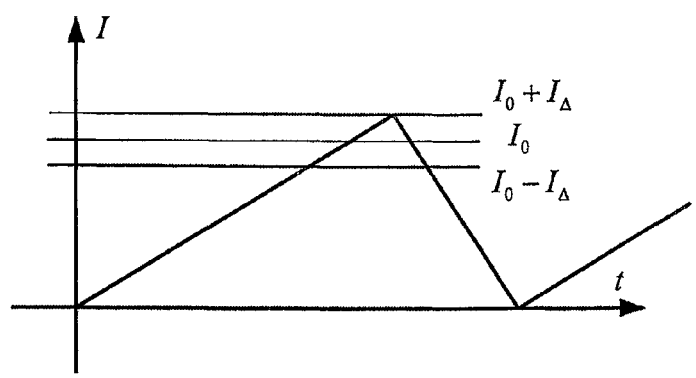
FIG. 25a and FIG. 25b are diagrams over hysteresis limits in a yet further embodiment.
Figure 25B:
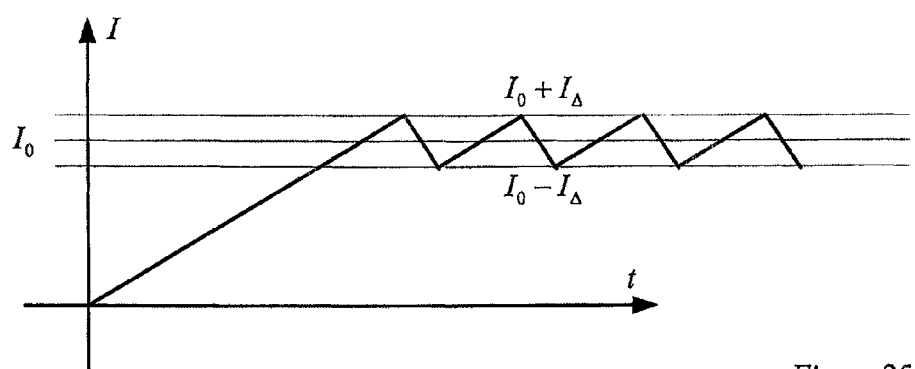

FIG. 25a shows the normal situation. FIG. 25b shows that the current instead oscillates around the hysteresis limits. This results in a higher frequency, whereby the risk of too low frequency is avoided. The frequency is determined by the hysteresis limits. This operation may be achieved by removing the voltage comparator at least temporarily when it is safe at higher currents. In this case, the switch losses will become higher, both because of a higher switch frequency and because the switch on consumes power, but this may be tolerated in order to increase the controllability of the circuit embodiment. The transition from the operation mode in FIG. 25a to the operation mode in FIG. 25b should be soft, for example by adjusting the hysteresis limits continuously depending on the operating conditions, for example as shown in FIG. 20.

Figure 26:
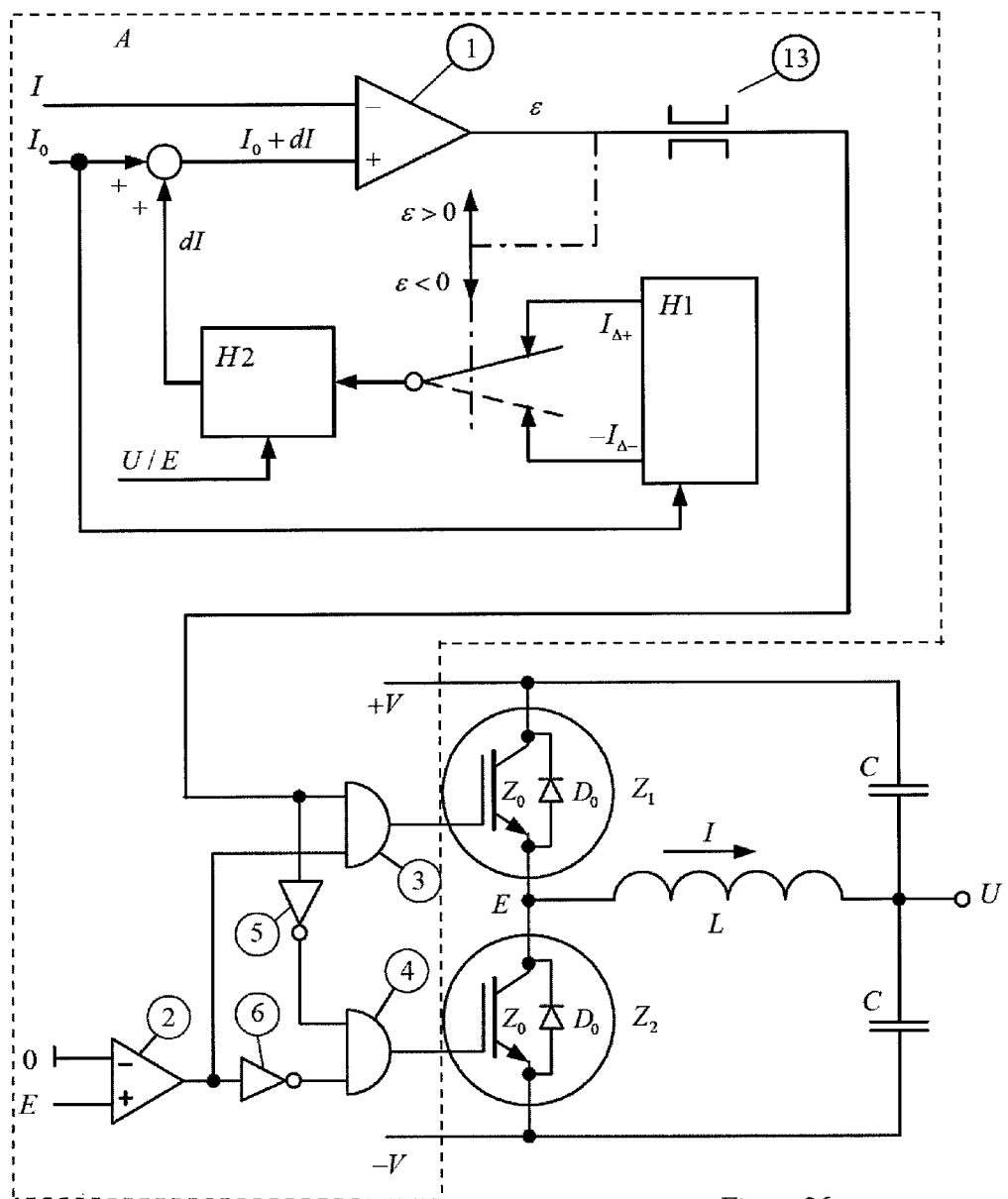
FIG. 26 is a circuit diagram of a complete system.

FIG. 26 shows a diagram of a complete system with dynamic hysteresis control according to the invention. The complete circuit can be of analogue design. However, a digital design of the new hysteresis comparator may be simpler. In FIG. 26, the components of control logic A (i.e., a control circuit) are designated within the box of dashed lines. Current comparator 1 is equivalent with current comparator 1 in FIG. 5, however with a new hysteresis feedback. The output signal e is positive as long as the signal to the plus input is more positive than the signal to the minus input. The output signal e is negative as long as the minus input is more positive than the positive input. The limiter 13 may be needed for adjustment of the signal levels to the correct logical levels in the rest of the system.

A digital switch, shown as a conventional relay contact, selects $dI=I_{\Delta+}$ as long as $\epsilon>0$.

The digital switch selects $dI=-I_{\Delta-}$ as long as $\epsilon<0$.

Several operation modes can be selected. The operation modes are created by the hysteresis control units H1 and H2.

The hysteresis control unit H1 calculates the two signals $I_{\Delta+}$ and $I_{\Delta-}$ in dependence of the reference current $I_0$.

Fixed hysteresis limits:

$$I_{\Delta+}=I_{\Delta-}=I_\Delta$$

Dynamic hysteresis limits for increasing the On-time of the "opposite" transistor according to FIG. 20:

If $I_0 \geq 2I_\Delta$

Then $I_{\Delta+}=I_\Delta \, I_{\Delta-}=I_0-I_\Delta$

If $-2I_\Delta \leq I_0 \leq 2I_\Delta$

Then $I_{\Delta+}=I_{\Delta-}=I_\Delta$

If $I_0 \leq -2I_\Delta$

Then $I_{\Delta+}=-I_0-I_\Delta \, I_{\Delta-}=I_\Delta$

Dynamic hysteresis limits for creating constant current gain according to FIG. 21:

If $I_0 \geq I_\Delta$

Then $I_{\Delta+}=I_0 \, I_{\Delta-}=I_\Delta$

If $-I_\Delta \leq I_0 \leq I_\Delta$

Then $I_{\Delta+}=I_{\Delta-}=I_\Delta$

If $I_0 \leq -I_\Delta$

Then $I_{\Delta+}=I_\Delta \, I_{\Delta-}=-I_0$

Combined hysteresis limits according to FIG. 22:

If $I_0 \geq 2I_\Delta$

Then $I_{\Delta+}=I_0 \, I_{\Delta-}=I_0-I_\Delta$

If $I_\Delta \leq I_0 \leq 2I_\Delta$

Then $I_{\Delta+}=I_0 \, I_{\Delta-}=I_\Delta$

If $-I_\Delta \leq I_0 \leq I_\Delta$

Then $I_{\Delta+}=I_{\Delta-}=I_\Delta$

If $-2I_\Delta \leq I_0 \leq -I_\Delta$

Then $I_{\Delta+}=I_\Delta \, I_{\Delta-}=-I_0$

If $I_0 \leq -2I_\Delta$

Then $I_{\Delta+}=-I_0-I_\Delta \, I_{\Delta-}=-I_0$

Reduced hysteresis limits for minimizing the switching losses according to FIG. 24:

If $I_0 \geq 2I_\Delta$

Then $I_{\Delta+}=I_{\Delta-}=I_{Dynamic}=I_\Delta-f(I_0)$

If $-2I_\Delta \leq I_0 \leq 2I_\Delta$

Then $I_{\Delta+}=I_{\Delta-}=I_{Dynamic}=I_\Delta$

If $I_0 \leq -2I_\Delta$

Then $I_{\Delta+}=I_{\Delta-}=I_{Dynamic}=I_\Delta-f(-I_0)$

The function $f^*(I_0)$ lets $I_{Dynamic}$ decrease towards a value that is smaller than $I_\Delta$.

The hysteresis control unit H2 modifies the hysteresis signal dI in dependence of the voltage quotient U/E.

If the system is intended to operate with the same hysteresis values, independent of the voltage quotient U/E, then the gain inside the control unit H2=1.

If the system is intended to adjust the hysteresis value in dependence of the voltage quotient U/E, then the gain inside the control unit $$H2 = \left(1-\left(\frac{U}{E}\right)^2\right)$$

In the above embodiments, the operation of the "upper" transistor has been described. It is however noted that the operation is similar but opposite for the "lower" transistor, and the operation moves from the upper transistor to the lower transistor in a seamless manner. Thus, the circuit is easy to control by a feedback system without any problems when passing zero current.

The embodiments may be used for any load, such as resistive, inductive of capacitive. However, the circuit is constructed for being advantageous for an inductive load, such as an electric motor. The embodiments can be constructed for operating any type of AC motors at any size, such as a motor for a domestic application such as a washing machine, having a size of less than 1 kW. It can also be constructed for an electric car motor having a size of 50 to 150 kW, etc. It can be used for a lift or elevator having a size of about 10 kW.

In the embodiments, switch transistors of the types IGBT and MOSFET are mentioned. However, any type of switch members can be used, such as semiconductor members. In principle, any type of switch member may be used, from mechanical switches to semiconductor switches of the transistor type or thyristor type or switchable diodes. The switch member should be switchable between a first state having a low inherent resistance or impedance to a second state having a high internal resistance or impedance. In addition, a freewheel diode is connected in parallel with the switchable member, either inherent in the construction, as for the MOSFET transistor, or as a separate component as for the IGBT transistor.

The voltages and currents controlled can be of any size within the maximum ratings of the components. Thus, the voltage can be from a few volts, such as 12 V, and up to several thousand volts, such as up to 6000 V. The current can be from very low current of less than 1 ampere to several thousands ampere, such as up to 5000 A. A typical motor for an electric car may be supplied from a DC link voltage with 300 to 600 V and operate at currents up to 300 A.

The frequencies are controlled by using hysteresis currents as described above. When operating in the hysteresis mode at low currents, the hysteresis values operate to limit the upper frequency so that the switch transistors are not overloaded. The hysteresis value can be controlled by temperature sensors at the power transistors, so that the temperature is maintained within safe limits. Thus, if the temperature is above a predetermined temperature, the hysteresis value may be increased so that the switch frequency decreases and the power dissipation decreases. The temperature compensation can be used in combination with any of the above modes of operation.

In addition, the hysteresis values may be adapted in dependence of the load, if it is resistive or capacitive or inductive.

The frequency limits of 10 kHz to 20 kHz has been mentioned above for IGBT transistors. However, in some applications, the lower frequency $f_{min}$ may be lower, for example 2 kHz, or still lower. This frequency $f_{min}$ is dependent on the lowest switching frequency that can be tolerated. In other examples, the upper frequency $f_{max}$ can be higher. For example for MOSFET, the maximum frequency can be 100 kHz. The maximum frequency that can be tolerated can be determined based on the temperature of the power transistors or diodes.

The maximum frequency can also be dependent on the maximum current, which the circuit is designed for, which is reflected in the size of the inductance L. If the $I_{peak}$ is lower, the switch frequency may be increased.

An inherent property of the switch circuit is the variable switch frequency during soft switching. The frequency is inversely proportional to the current. The present embodiments are intended to reduce the maximum switch frequency by help of a so called hysteresis operating mode.

According to equation (6) and equation (7) the switch frequency is also inversely proportional to the inductance value L. Consequently, alternatively or additionally, it would be possible to reduce the switch frequency by help of a variable inductor that has a higher value of the inductance at small currents. Such a variable inductor may be obtained by connecting two or more inductors in parallel or in series, depending on the operating current. The connection may be performed by mechanical or electronic switches. The connection may take place relatively seldom, such as only when other operation modes are insufficient. Alternatively, the connection can take place at each cycle of the output current, which operates for example at a low frequency of less than 50 Hz. In this case, electronic switches may connect different inductances in parallel according to demand.

Another possibility would be to design the inductor with an iron core or some other magnetic material that has a reduced cross section in part of the core. This section will go into saturation earlier than the rest of the core and become more or less equivalent with an airgap in the magnetic circuit. Consequently the inductance value will automatically decrease with higher currents.

Although the present invention has been described above with reference to specific embodiment, it is not intended to be limited to the specific form set forth herein. Rather, the invention is limited only by the accompanying claims and, other embodiments than those specific above are equally possible within the scope of these appended claims.

Several embodiments have been described above with specific combination of features. However, other combinations of features than those specifically set forth may be arranged and may be advantageous and all combinations of features that occur to the skilled person reading this specification should be included within the scope of the specification.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A device for providing electric power to a load, comprising two switch members ($Z_1$, $Z_2$) connected in series between positive and negative power supply rails, the first switch member being connected to the positive rail and the second switch member being connected to the negative rail and an inductor (L) being connected to a bridge point between the switch members and the load;

wherein each switch member comprises a switchable member and a flywheel diode connected in parallel with the switchable member;

a monitoring circuit for monitoring a current (I) through said inductor and a bridge voltage (E) at said bridge point;

a control circuit for providing control signals to the switch members for turning said switchable members ON and OFF;

the control circuit, when said current is positive, being adapted to turn the first switch member OFF when said current exceeds a predetermined control value ($I_0$) whereupon the current decreases towards zero and passes through the flywheel diode of the second switch member and to turn the first switch member ON when the current is zero and the bridge voltage (E) increases towards the positive rail and vice versa when said current is negative; and a hysteresis circuit having an upper hysteresis limit ($I_{A+}$) and a lower hysteresis limit ($I_{A-}$), which modifies said predetermined control value ($I_0$), said upper hysteresis limit ($I_{A+}$) and said lower hysteresis limit ($I_{A-}$) being arranged so that the maximum frequency of the device at low currents is limited, wherein when the control value ($I_0$) is between said upper hysteresis limit ($I_{A+}$) and said lower hysteresis limit ($I_{A-}$), the device operates in a hysteresis mode, in which the current is both positive and negative and wherein the amplitude of the current is substantially constant independently of the control value ($I_0$);

wherein the sum of said upper hysteresis limit ($I_{A+}$) and said lower hysteresis limit ($I_{A-}$) in said hysteresis mode is calculated based on a nominal maximum frequency $f_{max}$ according to the formula:

$$(I_{A+}+I_{A-})=E/(2*L*f_{max})$$

wherein
E is a bridge voltage
L is said inductor.

2. The device according to claim 1, wherein said upper hysteresis limit ($I_{A+}$) and said lower hysteresis limit ($I_{A-}$) are equal.

3. The device according to claim 1, wherein said lower hysteresis limit ($I_{A-}$) is dynamical outside said hysteresis mode.

4. The device according to claim 1, wherein said higher hysteresis limit ($I_{A+}$) is dynamical outside said hysteresis mode.

5. The device according to claim 1, wherein said upper hysteresis limit ($I_{A+}$) and said lower hysteresis limit ($I_{A-}$) are equal, and are reduced at high control current ($I_0$) outside said hysteresis mode.

6. A device for providing electric power to a load, comprising
two switch members ($Z_1$, $Z_2$) connected in series between positive and negative power supply rails, the first switch member being connected to the positive rail and the second switch member being connected to the negative rail and an inductor (L) being connected to a bridge point between the switch members and the load;
wherein each switch member comprises a switchable member and a flywheel diode connected in parallel with the switchable member;
a monitoring circuit for monitoring a current (I) through said inductor and a bridge voltage (E) at said bridge point;
a control circuit for providing control signals to the switch members for turning said switchable members ON and OFF;
the control circuit, when said current is positive, being adapted to turn the first switch member OFF when said current exceeds a predetermined control value ($I_0$) whereupon the current decreases towards zero and passes through the flywheel diode of the second switch member and to turn the first switch member ON when the current is zero and the bridge voltage (E) increases towards the positive rail and vice versa when said current is negative; and
a hysteresis circuit having an upper hysteresis limit ($I_{A+}$) and a lower hysteresis limit ($I_{A-}$), which modifies said predetermined control value ($I_0$),
said upper hysteresis limit ($I_{A+}$) and said lower hysteresis limit ($I_{A-}$) being arranged so that the maximum frequency of the device at low currents is limited,
wherein when the control value ($I_0$) is between said upper hysteresis limit ($I_{A+}$) and said lower hysteresis limit ($I_{A-}$), the device operates in a hysteresis mode, in which the current is both positive and negative and wherein the amplitude of the current is substantially constant independently of the control value ($I_0$);
wherein the sum of said upper hysteresis limit ($I_{A+}$) and said lower hysteresis limit ($I_{A-}$) in said hysteresis mode is calculated so that a maximum frequency $f_{max}$ is obtained according to the formula:

$$(I_{A+}+I_{A-})=E*(1-(U/E)^2)/2*L*f_{max}$$

wherein
E is a bridge voltage
U is a voltage over the load
L is said inductor.

7. The device according to claim 6, wherein said upper hysteresis limit ($I_{A+}$) and said lower hysteresis limit ($I_{A-}$) are equal.

8. The device according to claim 6, wherein said lower hysteresis limit ($I_{A-}$) is dynamical outside said hysteresis mode.

9. The device according to claim 6, wherein said higher hysteresis limit ($I_{A+}$) is dynamical outside said hysteresis mode.

10. The device according to claim 6, wherein said upper hysteresis limit ($I_{A+}$) and said lower hysteresis limit ($I_{A-}$) are equal, and are reduced at high control current ($I_0$) outside said hysteresis mode.

11. A method of operating a device for providing electric power to a load, said device comprising:
two switch members ($Z_1$, $Z_2$) connected in series between positive and negative power supply rails, the first switch member being connected to the positive rail and the second switch member being connected to the negative rail and an inductor (L) being connected to a bridge point between the switch members and the load;
wherein each switch member comprises a switchable member and a flywheel diode connected in parallel with the switchable member;
a monitoring circuit for monitoring a current (I) through said inductor and a bridge voltage (E) at said bridge point;
a control circuit for providing control signals to the switch members for turning said switchable members ON and OFF;
a hysteresis circuit having an upper hysteresis limit ($I_{A+}$) and a lower hysteresis limit ($I_{A-}$), which modifies said predetermined control value ($I_0$),
the method comprising:
turning the first switch member OFF by the control circuit, when said current is positive, when said current exceeds the predetermined modified control value ($I_0+I_{A+}$), whereupon the current decreases towards zero and passes through the flywheel diode of the second switch member; and
turning the first switch member ON when the current is zero and the bridge voltage (E) increases towards the positive rail and vice versa when said current is negative; and
wherein said upper hysteresis limit ($I_{A+}$) and said lower hysteresis limit ($I_{A-}$) are arranged so that the maximum frequency of the device at low currents is limited when the current (I) is between the predetermined modified upper control value ($I_0+I_{A+}$) and the predetermined modified lower control value ($I_0+I_{A-}$), which defines a hysteresis mode;
calculating the sum of said upper hysteresis limit ($I_{A+}$) and said lower hysteresis limit ($I_{A-}$) in said hysteresis mode based on a nominal maximum frequency $f_{max}$ according to the formula:

$$(I_{A+}+I_{A-})=E/(2*L*f_{max})$$

wherein
E is a bridge voltage
L is said inductor.

12. The method according to claim 11, wherein said lower hysteresis limit ($I_{A-}$) is dynamical outside said hysteresis mode.

13. The method according to claim 11, wherein said higher hysteresis limit ($I_{A+}$) is dynamical outside said hysteresis mode.

14. The method according to claim 11, wherein said upper hysteresis limit ($I_{A+}$) and said lower hysteresis limit ($I_{A-}$) are equal, and are reduced at high control current ($I_0$) outside said hysteresis mode.

15. A method of operating a device for providing electric power to a load, said device comprising:
two switch members ($Z_1$, $Z_2$) connected in series between positive and negative power supply rails, the first switch member being connected to the positive rail and the second switch member being connected to the negative rail and an inductor (L) being connected to a bridge point between the switch members and the load;

wherein each switch member comprises a switchable member and a flywheel diode connected in parallel with the switchable member;

a monitoring circuit for monitoring a current (I) through said inductor and a bridge voltage (E) at said bridge point;

a control circuit for providing control signals to the switch members for turning said switchable members ON and OFF;

a hysteresis circuit having an upper hysteresis limit ($I_{A+}$) and a lower hysteresis limit ($I_{A-}$), which modifies said predetermined control value ($I_0$), the method comprising:

turning the first switch member OFF by the control circuit, when said current is positive, when said current exceeds the predetermined modified control value ($I_0+I_{A+}$), whereupon the current decreases towards zero and passes through the flywheel diode of the second switch member; and turning the first switch member ON when the current is zero and the bridge voltage (E) increases towards the positive rail and vice versa when said current is negative; and wherein said upper hysteresis limit ($I_{A+}$) and said lower hysteresis limit ($I_{A-}$) are arranged so that the maximum frequency of the device at low currents is limited when the current (I) is between the predetermined modified upper control value ($I_0+I_{A+}$) and the predetermined modified lower control value ($I_0+I_{A-}$), which defines a hysteresis mode;

calculating the sum of said upper hysteresis limit ($I_{A+}$) and said lower hysteresis limit ($I_{A-}$) in said hysteresis mode so that a maximum frequency $f_{max}$ is obtained according to the formula:

$$(I_{A+}+I_{A-})=E*(1-(U/E)^2)/2*L*f_{max}$$

wherein

E is a bridge voltage

U is a voltage over the load

L is said inductor.

16. The method according to claim 15, wherein said lower hysteresis limit ($I_{A-}$) is dynamical outside said hysteresis mode.

17. The method according to claim 15, wherein said higher hysteresis limit ($I_{A+}$) is dynamical outside said hysteresis mode.

18. The method according to claim 15, wherein said upper hysteresis limit ($I_{A+}$) and said lower hysteresis limit ($I_{A-}$) are equal, and are reduced at high control current ($I_0$) outside said hysteresis mode.

* * * * *